(12) United States Patent
Vaschillo et al.

(10) Patent No.: US 8,370,436 B2
(45) Date of Patent: Feb. 5, 2013

(54) SYSTEM AND METHOD FOR EXTENDING A MESSAGE SCHEMA TO REPRESENT FAX MESSAGES

(75) Inventors: Alexander Vaschillo, Redmond, WA (US); Raghavendra Rachamadugu, Hyderabad (IN); Bert Van Hoof, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1667 days.

(21) Appl. No.: 10/938,169

(22) Filed: Sep. 10, 2004

(65) Prior Publication Data

US 2005/0088704 A1    Apr. 28, 2005

Related U.S. Application Data

(63) Continuation-in-part of application No. 10/692,097, filed on Oct. 23, 2003, now Pat. No. 8,150,923.

(51) Int. Cl.
*G06F 15/16* (2006.01)
*H04N 1/09* (2006.01)

(52) U.S. Cl. ........................................ 709/206; 358/305

(58) Field of Classification Search .................. 709/230, 709/202, 206, 228; 358/402, 425, 443, 445, 358/305

See application file for complete search history.

(56) References Cited

U.S. PATENT DOCUMENTS

| | | | | |
|---|---|---|---|---|
| 5,193,110 A * | 3/1993 | Jones et al. | ................ | 379/93.14 |
| 5,781,901 A | 7/1998 | Kuzma | | |
| 5,794,039 A | 8/1998 | Guck | | |
| 5,848,415 A | 12/1998 | Guck | | |
| 5,911,776 A * | 6/1999 | Guck | ............................ | 709/217 |
| 6,112,024 A | 8/2000 | Almond | | |
| 6,134,582 A | 10/2000 | Kennedy | | |
| 6,212,553 B1 | 4/2001 | Lee et al. | | |
| 6,260,050 B1 * | 7/2001 | Yost et al. | ...................... | 715/202 |
| 6,324,569 B1 | 11/2001 | Ogilvie | | |
| 6,396,598 B1 * | 5/2002 | Kashiwagi et al. | ........... | 358/474 |
| 6,404,762 B1 | 6/2002 | Luzeski et al. | | |
| 6,430,174 B1 | 8/2002 | Jennings | | |
| 6,430,177 B1 | 8/2002 | Luzeski | | |
| 6,477,243 B1 * | 11/2002 | Choksi et al. | ............ | 379/100.06 |
| 6,487,278 B1 | 11/2002 | Skladman | | |

(Continued)

FOREIGN PATENT DOCUMENTS

| | | |
|---|---|---|
| CN | 101366016 | 2/2009 |
| EP | 1298872 | 4/2003 |

(Continued)

OTHER PUBLICATIONS

Feng, L., et al., "Schemata Transformation of Object-Oriented Conceptual Models to XML," *Comput. Syst. Sci. & Eng.* 18(1):45-60, Jan. 2003.

(Continued)

*Primary Examiner* — Ian N Moore
*Assistant Examiner* — Afshawn Towfighi
(74) *Attorney, Agent, or Firm* — Wolfe-SBMC

(57) ABSTRACT

The present invention extends to methods, systems, computer program products, and data structures for efficiently storing and accessing electronic messages representing fax transmissions. The messages are extended according to a fax schema that defines formats for adding fax protocol specific and/or or fax application specific data fields to an electronic message. According to the fax schema, the messages have relationships with other data fields stored using other schemas that define the accounting services, message content, and message participants associated with the fax transmission. The fax schema promotes efficient storage and access of electronic messages representing fax transmissions, while also facilitating integrating messages received by fax transmission with other types of existing message protocols and message applications.

44 Claims, 16 Drawing Sheets

U.S. PATENT DOCUMENTS

| | | |
|---|---|---|
| 6,493,703 B1 | 12/2002 | Knight |
| 6,549,612 B2 | 4/2003 | Gifford |
| 6,738,800 B1 | 5/2004 | Aquilon |
| 6,778,642 B1 | 8/2004 | Schmidt |
| 6,782,414 B1 | 8/2004 | Xue et al. |
| 7,116,766 B2 | 10/2006 | Owens |
| 7,119,918 B2 | 10/2006 | Toyoda |
| 7,171,432 B2 | 1/2007 | Wildhahen |
| 7,263,698 B2 | 8/2007 | Wildhagen et al. |
| 7,426,519 B2 | 9/2008 | Vaschillo et al. |
| 2002/0013817 A1 | 1/2002 | Collins |
| 2002/0133568 A1 | 9/2002 | Smith et al. |
| 2002/0152220 A1 | 10/2002 | Kang et al. |
| 2002/0178353 A1 | 11/2002 | Graham |
| 2003/0018644 A1 | 1/2003 | Bala |
| 2003/0018721 A1 | 1/2003 | Gupta |
| 2003/0088704 A1 | 5/2003 | Mertama |
| 2003/0093565 A1 | 5/2003 | Berger et al. |
| 2003/0105712 A1 | 6/2003 | Bodensohn |
| 2003/0109271 A1 | 6/2003 | Lewis et al. |
| 2004/0044998 A1 | 3/2004 | Wildhagen |
| 2004/0103367 A1* | 5/2004 | Riss et al. ............... 715/506 |
| 2004/0109197 A1 | 6/2004 | Gardaz |
| 2004/0111302 A1 | 6/2004 | Falk |
| 2004/0128355 A1 | 7/2004 | Chao et al. |
| 2004/0133646 A1 | 7/2004 | Leukert-Knapp |
| 2004/0143569 A1 | 7/2004 | Gross et al. |
| 2004/0181467 A1 | 9/2004 | Raiyani |
| 2004/0203664 A1 | 10/2004 | Lei |
| 2004/0205731 A1 | 10/2004 | Junkermann |
| 2004/0229595 A1 | 11/2004 | Laursen |
| 2004/0237042 A1 | 11/2004 | Murray |
| 2004/0243926 A1 | 12/2004 | Trenbeath |
| 2005/0033811 A1 | 2/2005 | Bhogal |
| 2005/0033813 A1 | 2/2005 | Bhogal |
| 2005/0050073 A1 | 3/2005 | Demiroski et al. |
| 2005/0060317 A1 | 3/2005 | Lott |
| 2005/0108332 A1 | 5/2005 | Vaschillo et al. |
| 2007/0208802 A1 | 9/2007 | Barman |

FOREIGN PATENT DOCUMENTS

| | | |
|---|---|---|
| JP | 2000151685 | 5/2000 |
| JP | 2003085500 | 3/2003 |
| JP | 2003162436 | 6/2003 |
| JP | 2003288332 | 10/2003 |
| JP | 2007519080 | 7/2007 |
| KR | 20060112181 | 10/2006 |
| WO | WO-0119082 | 3/2001 |
| WO | WO-0198936 | 12/2001 |
| WO | WO-0219082 | 3/2002 |
| WO | WO-2004032542 | 4/2004 |
| WO | WO-2005046104 | 5/2005 |

OTHER PUBLICATIONS

Joseph, M., "The UML for Data Modellers," *Elektron*, Apr. 2004, pp. 72-73.

Wang, G., and M. Liu, "Extending XML Schema with Nonmonotonic Inheritance," in M.A. Jeusfeld and O. Pastor (eds.), *ER 2003 Workshops, Lecture Notes in Computer Science 2814*:402-407, 2003.

"Final Office Action", U.S. Appl. No. 10/692,097, (May 25, 2010),37 pages.

"Final Office Action", U.S. Appl. No. 10/693,547, (Feb. 6, 2008),10 pages.

"Final Office Action", U.S. Appl. No. 10/971,403, (May 22, 2008),21 pages.

"Non-Final Office Action", U.S. Appl. No. 10/692,097, (Oct. 30, 2009),36 pages.

"Non-Final Office Action", U.S. Appl. No. 10/693,547, (Aug. 2, 2007),8 pages.

"Non-Final Office Action", U.S. Appl. No. 10/835,822, (Dec. 31, 2007),11 pages.

"Non-Final Office Action", U.S. Appl. No. 10/971,403, (Jun. 27, 2007),17 pages.

"Non-Final Office Action", U.S. Appl. No. 10/971,403, (Sep. 17, 2008),29 pages.

"Notice of Allowance", U.S. Appl. No. 10/692,201, (Oct. 11, 2006),13 pages.

"Notice of Allowance", U.S. Appl. No. 10/693,547, (Jun. 13, 2008),13 pages.

"Notice of Allowance", U.S. Appl. No. 10/8385,822, (Feb. 17, 2009),19 pages.

"Notice of Allowance", U.S. Appl. No. 10/971,403, (Apr. 10, 2009),20 pages.

"Outlook Express EML", available at <<http://www.computing.net/answers/window-95/outlook-express/134849.html>>, (Dec. 2002),9 pages.

Barber, S. "Network News Transport Protocol Internet Draft", retrieved from <<http://tools.ietf.org/html/draft-ietf-nntpext-base-15>> on Oct. 13, 2009, (Jan. 2002),pp. 1-69.

Freed, N. "RFC 2017, Definition of the URL MIME External-Body Access-Type", retrieved from <<http://www.faqs.org/rfcs/rfc2017.html>> on Jan. 3, 2011, (Oct. 1996),5 pages.

Freed, N. "RFC 2045, MIME Part One: Format of Internet Message Bodies", retrieved from <<http://www.faqs.org/rfcs/rfc2045.html>> on Jan. 3, 2010, (Nov. 1996),28 pages.

Freed, N. "RFC 2045, MIME Part Two: Media Types", retrieved from <<http://www.ietf.org/rfc/rfc2045.txt>>, (Nov. 1996),31 pages.

Mao, Z. M., et al., "Achieving Service Portability Using Self-Adaptive Data Paths", California University, Berkeley, CA., *IEEE Communications Magazine*, (Jan. 2002),7 pages.

Raman, et al., "Universal Inbox: Providing Extensible Personal Mobility and Service Mobility in an Integrated Communication Network", *Division of Computer Science*, California University, Berkeley, CA, (2000),12 pages.

Thurston, M. G., "An Open Standard for Web-Based Condition-Based Maintenance Systems", *IEEE 2001, Appl. Res. Lab.*, Pennsylvania State Univ., University park, PA, (2001),pp. 401-415.

Widener, et al., "Open Metadata Formats: Efficient XML-Based Communcation for Heterogeneous Distributed Systems", *College of Computing, Georgia Institute of Technology*, Atlanta GA, IEEE 2001, (2001),10 pages.

"Advisory Action", U.S. Appl. No. 10/877,893, (Oct. 25, 2007),3 pages.

"Final Office Action", U.S. Appl. No. 10/877,893, (Jul. 6, 2007),26 pages.

"Non-Final Office Action", U.S. Appl. No. 10/692,097, (Feb. 28, 2011),40 Pages.

"Non-Final Office Action", U.S. Appl. No. 10/877,893, (Jan. 8, 2008),6 pages.

"Non-Final Office Action", U.S. Appl. No. 10/877,893, (Feb. 5, 2007),20 pages.

"Notice of Allowance", U.S. Appl. No. 10/877,893, (May 12, 2008),7 pages.

"Foreign Notice of Allowance", Chinese Application No. 200480001335.X, (May 26, 2011),4 pages.

"Foreign Notice of Allowance", Japanese Application No. 2006-5366011, (Dec. 17, 2010),6 pages.

"Foreign Office Action", Chinese Application No. 200480001335.X, (Oct. 16, 2009),44 pages.

"Foreign Office Action", Chinese Application No. 200480001335.X, (Sep. 26, 2010),10 Pages.

"Foreign Office Action", Japanese Application No. 2006-536601, (May 28, 2010),9 pages.

"Foreign Office Action", Japanese Application No. 2006-536601, (Nov. 12, 2010),3 pages.

"Foreign Office Action", Korean Application No. 10-2005-7008251, (Feb. 10, 2011),4 pages.

"International Search Report", Application No. PCT/US04/24813, (Sep. 24, 2007),4 pages.

"Notice of Allowance", U.S. Appl. No. 10/692,097, (Oct. 24, 2011),27 pages.

"Notice of Allowance", U.S. Appl. No. 10/835,822, (Feb. 17, 2009),19 pages.

"Written Opinion", Application No. PCT/US04/24813, (Sep. 24, 2007),4 pages.

"Foreign Notice of Allowance", Korean Application No. 10-2005-7008251, (Oct. 17, 2011), 5 pages.

"Partial European Search Report", EP Application No. 04779765.9, (Feb. 14, 2012), 4 pages.

"Supplementary European Search Report", Application No. 04779765.9, (Sep. 14, 2012), 3 pages.

* cited by examiner

SYSTEM AND METHOD FOR EXTENDING A MESSAGE SCHEMA TO REPRESENT FAX MESSAGES

CROSS-REFERENCE TO RELATED APPLICATION

This application is a continuation-in-part of a prior United States patent application entitled Schema Hierarchy for Electronic Messages, application Ser. No. 10/692,097, filed Oct. 23, 2003, and is hereby incorporated by reference.

FIELD OF THE INVENTION

In general, the present invention relates to electronic messaging and, more particularly, to efficiently storing and accessing electronic message related data representing fax messages.

BACKGROUND OF THE INVENTION

Computer systems and related technology affect many aspects of society. Indeed, the computer system's ability to process information has transformed the way we live and work. Computer systems now commonly perform a host of tasks (e.g., word processing, scheduling, and database management) that prior to the advent of the computer system were performed manually. More recently, computer systems have been coupled to one another and to other electronic devices to form both wired and wireless computer networks over which the computer systems and other electronic devices can transfer electronic data. As a result, many tasks performed at a computer system (e.g., voice communication, accessing electronic mail, controlling home electronics, web browsing) include electronic communication between a number of computer systems and/or other electronic devices via wired and/or wireless computer networks.

In particular, electronic messaging has become an important method for communicating. Computer system users often send and receive electronic messages (e.g., electronic mail messages, instant messages, faxes, news group postings, etc.,) to exchange information with one another. For example, to create an electronic mail message, a sending user typically selects a new message option from within an electronic mail application. In response to the selection, the electronic mail application displays one or more fields (e.g., a To field, a Body field, etc.) that can receive user entered data. The sending user then enters data (e.g., at a keyboard) into the displayed fields. When appropriate, the sending user can save the electronic mail message as a draft or send the electronic mail message to a recipient user (e.g., by selecting the appropriate "save" or "send" control within the electronic mail application).

Sending the electronic mail message may cause the electronic mail message to be routed from the sending user's computer system, through a sending mail server, across a network, to a receiving mail server that stores electronic mail messages for a recipient user. To view the electronic mail message, the recipient user establishes a connection from an electronic mail application to the receiving mail server. Establishing the connection can cause all electronic mail messages sent to the recipient user, including the mail message from the sending user, to be transferred from the receiving mail server to the recipient user's computer system and stored at the recipient user's computer system. After the electronic mail message from the sending user is transferred and stored, the recipient user may manipulate an input device, such as, for example, a mouse, within the electronic mail application to view the stored electronic mail message.

In addition to electronic mail applications, computer system users can also use other messaging applications to send, receive, and store other different types of electronic messages. Unfortunately, different types of electronic messages (e.g., electronic mail messages, instant messages, faxes, blog entries, voice messages, etc.) are typically stored in different data formats. For example, a data format used to store one type of electronic message, such as, for example, an instant message, typically differs from the data format used to store other different types of electronic message, such as, for example, a news group posting. Thus, to access a specified type of electronic message, a user is required to use a messaging application that can access data stored in the data format corresponding to the specified type of electronic message. For example, a user is typically required to use an instant messaging application to access instant messages, or a fax console to send or receive a fax transmission.

Further, messaging applications are typically configured to access only a few, or even only one, type of electronic message and cannot generally be used to access other additional types of electronic messages. That is, messaging applications are typically designed to access data stored in a limited number of data formats, and potentially only one data format, that corresponds to one or more specified electronic message types. For example, an instant message application is typically configured to access data stored in one or more instant message data formats but is typically not configured to access data stored in fax data formats.

Additionally, some data formats can be application specific. Thus, two messaging applications configured to access the same type of electronic messages may nonetheless use different data formats to store electronic message data. For example, a first electronic mail application may store electronic mail messages using a first data format, while a second electronic mail application stores electronic mail messages using a second different data format. Thus, a messaging application developed to access electronic messages of a particular type may not be able to access all electronic messages of the particular type. For example, an electronic mail message stored in the first data format by the first electronic mail application may not be accessible to the second electronic mail application (e.g., that can only access electronic mail messages stored in the second data format).

Also, each different messaging application typically stores corresponding electronic messages in a different database. For example, an instant messaging application can store instant messages in an instant messaging database, an electronic mail application can store electronic mail messages in an electronic mail messaging database, a news group reader can store news group postings in a news group database, and a fax application can store faxes in a fax format, etc.

Accordingly, most, if not all, computer systems include a number of messaging applications for storing and accessing message data stored in different data formats and residing in different databases. For example, a computer system can include an electronic mail application for accessing electronic mail messages, an instant message application for accessing instant message, a fax console or other type of fax application for accessing faxes, etc. Using multiple electronic messaging applications can be time consuming, for example, when a user desires to access all available electronic messages corresponding to a specified entity. If the desired electronic messages are stored in different data formats and/or reside in different databases, each messaging application will have to perform a separate search for desired electronic messages. For example, the user may be required to switch to an electronic mail application (or even switch between multiple electronic mail applications) to search for electronic mail messages, switch to an instant message application to search for instant messages, switch to a voice message application to search for voice messages, and switch to a fax application to receive message information. Having multiple messaging applications perform searches for electronic messages potentially results in an undesirable expenditure of time and computer system resources.

Searches and queries for specific electronic messages or electronic message related data must also be performed separately at each of the electronic messaging applications. That is, a user would be required to use an electronic mail application to search for electronic mail messages. However, the user typically could not use the electronic mail application to search for stored instant messages, voice messages, or fax messages, unless the electronic mail application has the capability of treating them as attachments to the electronic mail message, a solution which may not always be available. Having to perform separate searches at each messaging application can be particularly problematic when the electronic message type is unknown. The user may be required to execute searches in each of a number of different messaging applications to locate a single electronic message. Therefore systems, methods, computer program products, and data structures for more efficiently storing and accessing message related data would be advantageous.

SUMMARY OF THE INVENTION

The foregoing problems with the prior state of the art are overcome by the principles of the present invention, which is directed toward methods, systems, computer program products, and data structures for efficiently storing and accessing electronic message related data. The present invention is further directed toward methods, systems, computer program products, and data structures for integrating electronic message related data representing fax transmissions with electronic message related data representing other types of messages to facilitate compatibility with existing message protocols and message applications.

According to one aspect of the invention, electronic messages are created in accordance with an electronic message schema hierarchy. Electronic messages can be created such that some data fields are commonly defined (e.g., a subject field, a participants field, an importance field, etc.) even between different types of electronic messages (e.g., between electronic mail messages, instant messages, and fax transmissions). Electronic messages can also be created such that some data fields, for example, data fields specific to particular message protocols and/or particular message applications are separately defined (e.g., a PosterID for a news group posting, deleted field for an electronic mail message, and number of retries for a fax transmission) and can thus differ between different types of messages. Accordingly, an electronic message can have some fields in common with other electronic messages and some fields that differ from other electronic messages. Having some commonly defined fields and other differently defined fields promotes efficient storage and access of electronic messages, while also facilitating message compatibility with existing message protocols and message applications.

According to another aspect of the invention, the message schema hierarchy includes a message schema defining data fields that can be common to different types of electronic messages and includes message extension schemas defining data fields for particular message protocols and particular message extensions. When a message is created it can include data fields as defined in the message schema and can include other fields specific to particular message protocols and/or message applications. A computer system creates a message item representing an electronic message in accordance with the message schema. The computer system assigns a primary message type to the message. The primary message type indicates a primary behavior (e.g., electronic mail message, instant message, etc.) of one or more content portions linked to created message item. Since message items representing different message types have a number of similarly defined data fields (i.e., a similar format), message items can be more efficiently stored and accessed from a single database.

According to yet another aspect of the invention, the computer system assigns one or more protocol extensions to the created message item. Each assigned protocol extension can add one more protocol specific properties to the created message item that promote compatibility with a specified message protocol. The computer system assigns one or more application extensions to the created message item. Each assigned application extension can add one more application specific properties to the created message item that promote compatibility with a with a specified message application. A message item of any primary type can be assigned virtually any number of protocol extensions and/or application extensions. For example, an instant message could be assigned a POP3 extension and a fax application extension that facilitate transferring the instant message via POP3 and viewing the instant message at the fax application. Accordingly, a message of any primary type can be configured for compatibility with a number of different message protocols and different message applications.

According to still another aspect of the invention, the message schema hierarchy includes a fax schema defining data fields that may be common to different types of fax transmissions and includes fax extension schemas defining data fields for particular fax distribution and transport protocols and for particular fax applications. A message item representing a fax transmission can be assigned virtually any number of fax protocol extensions and/or fax application extensions according to the fax schema. For example, a fax transmission could be assigned an extension for a remote fax server communication protocol and an extension for a particular electronic mail application. The extensions facilitate various aspects of fax transmission, such as transmitting the fax using a remote fax server and sending the transmitted fax to one or more fax recipients as an attachment to an electronic mail message addressed to the recipient for viewing with the electronic mail application. As yet another example, a fax transmission could be assigned a fax protocol extension for an internet-based fax service and a fax application extension for a PC-based fax application that enables users to work with fax documents similar to the way they work with electronic mail. Instead of receiving the transmission in a separate fax console, or as an attachment to an electronic mail message, the assigned message extensions enable the fax transmission to be received, addressed, and transmitted with the PC-based fax application regardless of the underlying fax distribution/transportation mechanism.

According to one other aspect of the invention, the fax schema further includes message relationships representing accounting data associated with the fax transmission, the content of the fax transmission, and the participants associated with the fax transmission. The message relationships representing accounting data define data fields that can be common to different types of accounting services related to fax transmissions in general, and include a fax account schema defining data fields for particular fax servers and fax accounts. The message relationships representing the content of the fax transmission include a fax message content schema defining data fields to contain the fax content, such as the image, text, or file comprising the content of the fax transmission. The message relationships representing the participants associated with the fax transmission includes a fax message transmission schema for defining data fields that describe the specific attributes of participants in a fax transmission.

According to yet another aspect of the invention, the fax schema includes a fax cover page schema for defining data fields that can be common to different types of cover pages generated for fax transmissions, and includes a fax cover page defining data fields for cover pages that are hosted on a fax server.

According to one aspect of the invention, data values stored as extension specific fields corresponding to one message extension can be used to transform a message item for compatibility with another message extension. A computer system accesses a message item representing an electronic message. The message item has one or more general properties that are common to a plurality of different types of message protocols and a plurality of different types of message applications. The message item also includes one or more currently assigned specific properties that are specific to at least one currently assigned message extension (e.g., a currently assigned fax protocol extension or fax application extension).

According to yet another aspect of the invention, the computer system assigns a new message extension (e.g., a newly assigned message protocol extension or message application extension) to the message item. The new message extension has one or more new specific properties that are to be associated with the message item. The computer system sends the message item in accordance with both the currently assigned message extension and the new message extension. Accordingly, a single message item can be sent to a number of applications without having to duplicate the content of the message item. Sending a single message item increases the likelihood of different applications, for example, an electronic mail application and a fax application, receiving consistent data. The computer system may also retrieve one or more values form the currently assigned extension and optionally use the retrieved values to populate fields corresponding to the new message extension. Using values from currently assigned extension to populate fields corresponding to a newly assigned extension can conserve resources and alleviate a user from having to manually enter values.

According to still another aspect of the invention, message items may be stored in a message silo portion of a database. The database can also include other silos, such as, for example, a contacts silo, and folder, silo, and a document silo. Fields of message items can include links to items stored in other silos. For example, message participant field of a message item can include a link to a contact item in the contacts silo. Message items can be stored in folders that also have protocol or application specific extensions.

Additional features and advantages of the invention will be set forth in the description that follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1:
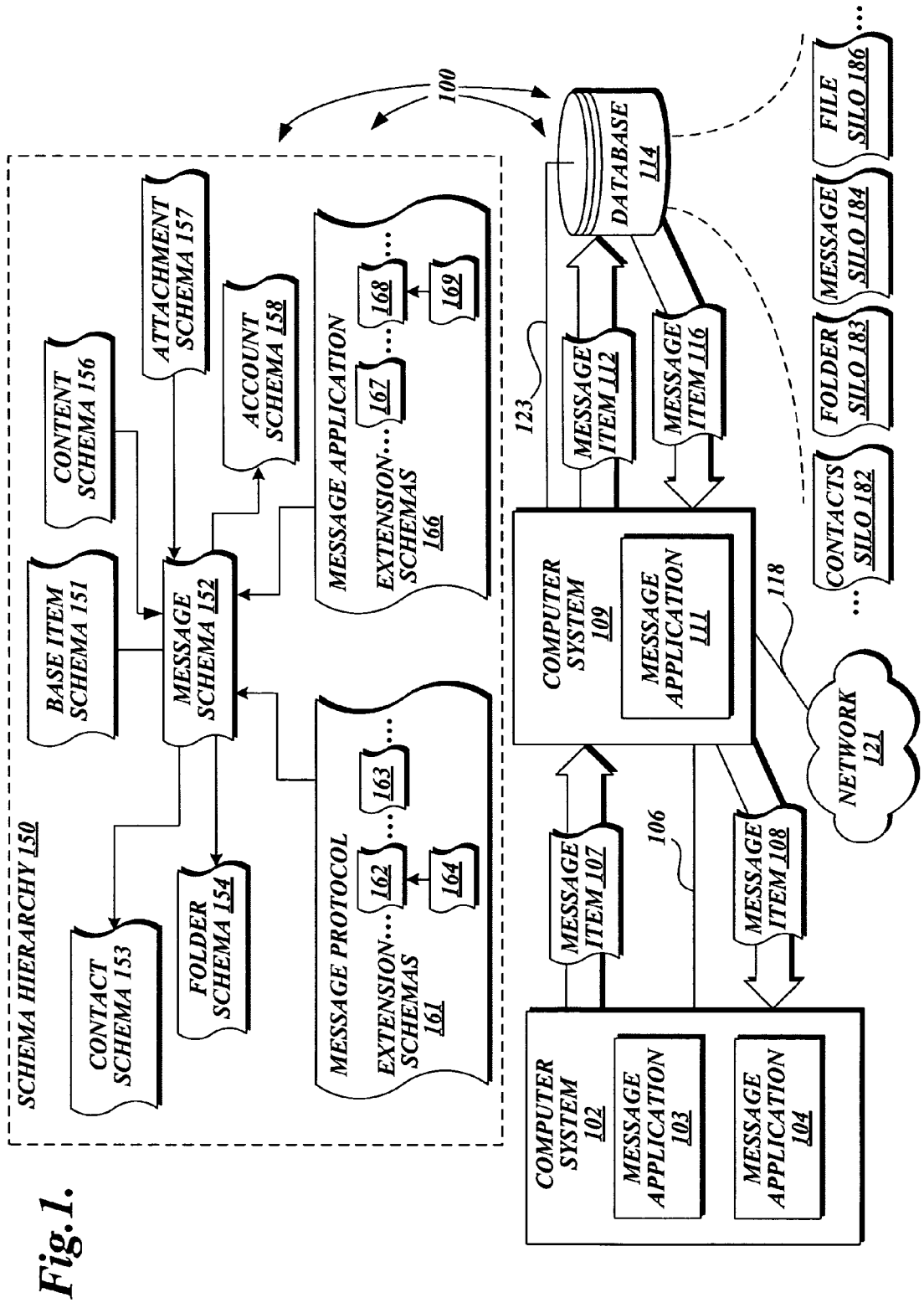
FIG. 1 illustrates an example of a network architecture and general schema hierarchy that facilitate efficiently storing and accessing electronic message related data in accordance with the principles of the present invention.

The principles of the present invention provide for efficiently storing and accessing electronic message related data in general, and further provides for efficiently storing and accessing electronic message related data representing fax transmissions. Generally, electronic messages are created in accordance with an electronic message schema hierarchy. Electronic messages can be created such that some data fields are commonly defined (e.g., a subject field, a participants field, an importance field, etc.) even between different types of electronic messages (e.g., between electronic mail messages and instant messages) and other data fields, for example, data fields specific to particular message protocols and/or particular message applications are separately defined (e.g., a PosterID for a news group posting, a deleted field for an electronic mail message, and the number of retries for a fax transmission) differ between different types of electronic messages. Accordingly, an electronic message can have some fields in common with other electronic messages and some fields that differ from other electronic messages. Having some commonly defined fields and other differently defined fields promotes efficient storage and access of electronic messages, while also facilitating message compatibility with existing message protocols and message applications.

Embodiments within the scope of the present invention include computer-readable media for carrying or having computer-executable instructions or data structures stored thereon. Such computer-readable media may be any available media, which is accessible by a general-purpose or special-purpose computer system. By way of example, and not limitation, such computer-readable media can comprise physical storage media such as RAM, ROM, EPROM, CD-ROM or other optical disk storage, magnetic disk storage or other magnetic storage devices, or any other media which can be used to carry or store desired program code means in the form of computer-executable instructions, computer-readable instructions, or data structures and which may be accessed by a general-purpose or special-purpose computer system.

In this description and in the following claims, a "network" is defined as one or more data links that enable the transport of electronic data between computer systems and/or modules. When information is transferred or provided over a network or another communications connection (either hardwired, wireless, or a combination of hardwired or wireless) to a computer system, the connection is properly viewed as a computer-readable medium. Thus, any such connection is properly termed a computer-readable medium. Combinations of the above should also be included within the scope of computer-readable media. Computer-executable instructions comprise, for example, instructions and data which cause a general-purpose computer system or special-purpose computer system to perform a certain function or group of functions. The computer executable instructions may be, for example, binaries, intermediate format instructions such as assembly language, or even source code.

In this description and in the following claims, a "computer system" is defined as one or more software modules, one or more hardware modules, or combinations thereof, that work together to perform operations on electronic data. For example, the definition of computer system includes the hardware components of a personal computer, as well as software modules, such as the operating system of the personal computer. The physical layout of the modules is not important. A computer system may include one or more computers coupled via a network. Likewise, a computer system may include a single physical device (such as a mobile phone or Personal Digital Assistant "PDA") where internal modules (such as a memory and processor) work together to perform operations on electronic data.

In this description and in the following claims, a "schema" is defined as an expression of a shared vocabulary between a plurality of computer systems that allows the plurality of computer systems to process documents according to the expressed shared vocabulary. For example, an eXtensible Markup Language ("XML") schema can define and describe a class of XML documents using schema constructs (e.g., name/value pairs) of an XML schema language. These schema constructs can be used to constrain and document the meaning, usage, and relationships of data types, elements and their content, attributes and their values, entities and their contents, and notations, as used in XML documents. Thus, any computer system that can access an XML schema can process XML documents in accordance with the XML schema. Further, any computer system that can access an XML schema can compose or modify XML documents for use by other computer systems and/or message processors that can also access the XML schema.

Schema is defined to include Document Type Definitions ("DTD"), such as, for example, DTD files ending with a ".dtd" extension. Schema is also defined to include World Wide Web Consortium ("W3C") XML Schemas, such as, for example, XML Schema files ending with a ".xsd" extension. However, the actually file extension for a particular DTD or XML schema is not important. A schema can be utilized to define virtually any data type including logical, binary, octal, decimal, hexadecimal, integer, floating-point, character, character string, user-defined data types, and combinations of these data types used to defined data structures. Some examples of user-defined data types are DateTime data types representing date and time data and EAddress data types representing electronic addresses data, such as, for example, telephone numbers, electronic mail address, instant message addresses, etc. A datatype (or entity) can also be defined to reference or link to other datatypes (or entities) in a schema hierarchy.

Those skilled in the art will appreciate that the invention may be practiced in network computing environments with many types of computer system configurations, including, personal computers, laptop computers, hand-held devices, multi-processor systems, microprocessor-based or programmable consumer electronics, network PCs, minicomputers, mainframe computers, mobile telephones, PDAs, pagers, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

FIG. 1 illustrates an example of a network architecture 100 and general schema hierarchy 150 that facilitate efficiently storing and accessing electronic message related data in accordance with the principles of the present invention. Network architecture 100 includes computer system 102, computer system 109, database 114, and network 121. Computer system 102 and computer system 109 are connected by corresponding link 106. Computer system 102 and computer system 109 can exchange electronic messages (e.g., electronic mail messages, instant messages, fax messages, news group postings, voice messages, etc.) over link 106. For example, it may be that computer system 109 is a messaging server that stores electronic messages, such as a fax server that sends and receives fax transmissions. From time to time computer system 102 may connect to computer system 109 to download electronic messages, or to send and receive fax transmissions.

Computer system 109 is connected to database 114 by link 123. Database 114 can be a database that stores a plurality of different types of database items. For example, contacts silo 183 can store contact items representing contacts (e.g., individual, organizations, or corporations), folder silo 183 can store folder items representing folders that store other types of items (e.g., electronic messages), message silo 184 can store message items representing electronic messages, document silo 186 can store document items representing various documents, etc. Database items stored in database 114 can include data fields defined in accordance with the schemas of schema hierarchy 150. A series of three periods (an ellipsis) before contacts silo 182 and after document silo 186 indicates that other silos (potentially storing other different types database items) can be included in database 114.

Computer system 109 is connected to network 121 by link 118. Network 121 can be a Local Area Network ("LAN"), Wide Area Network ("WAN"), or even the Internet. Computer system 109 can receive data from and send data to other computer systems connected to network 121 over link 118. Computer system 102, computer system 109, and possibly other computer systems connected to network 121 can have access to schemas included in schema hierarchy 150.

Schema hierarchy 150 generally represents data formats for defining electronic messages. Message items representing electronic messages (as well as other types of items in database 114) can be defined in accordance with base item schema 151. Generally, a base item schema can define data formats for data fields (e.g., a globally unique ID and display name) used to differentiate one database item from another database item. Accordingly, message items stored in message silo 184 (as well as items stored contacts silo 182, folder silo 183, and document silo 186) can include one or more data fields defined in accordance with base item schema 151.

Message schema 152 defines data formats for one or more data fields (e.g., message subject, message size, etc.) that are common to a plurality of different types of electronic messages. Message schema 152 can define a common format, such as, for example, a text format or HyperText Markup Language ("HTML") format. Accordingly, message items stored in message silo 184 can include one or more data fields defined in accordance with message schema 152. Message items stored in message silo 184 may also include data fields defined in accordance with one or more message extension schemas. Message schema 152 can define data fields that refer or link to data fields defined in accordance with other schemas in schema hierarchy 150.

For example, message schema 152 can define one or more data fields that refer or link to contact related information (having data fields defined in accordance with contact schema 153) in contacts silo 182. Accordingly, a message item defined in accordance with message schema 152 can refer or link to contacts related information in contacts silo 182. Referring to or linking to contact related information can indicate that the entity corresponding to the contact related information is associated with the message item. Similarly, message schema 152 can define one or more data fields that refer or link to a folder related information (having data fields defined in accordance with folder schema 154) in folders silo 183. Accordingly, a message item defined in accordance with message schema 152 can also refer or link to folder related information in folder silo 183. Referring to or linking to a folder related information can indicate that the message item is stored in a folder corresponding to the folder related data.

Likewise, message schema 152 can define one or more data fields that refer to link to document related information. Accordingly, a message item defined in accordance with schema 152 can include one or more attachments (having data fields defined in accordance with attachment schema 157) that refer or link to document related data in document silo 186. Referring to or linking to document related data can indicate that the document corresponding to the document related data was an attachment to the message item. For example, a message item can include an attachment, such as, a word processing document, a calendar appointment, a picture, etc. When an attachment is schematized a receiving computer system can process the attachment more intelligently. For example, a computer system can query fields of a schematized attachment and process the schematized attachment according to the values stored in the fields.

Further, a message item defined in accordance with message schema 152 can refer or link to account related data defined in accordance with account schema 158. The content of a message item (e.g. a message body or message attachment) can include data fields defined in accordance with content schema 156.

A message item defined in accordance with schema 152 can also include data fields defined in accordance with one or more message extensions schemas. Some message extension schemas can be protocol extensions that promote compatibility with specified message protocols. For example, message protocol extension schemas 161 can contain one or more message protocol extension schemas defining data fields that are specific to particular message protocols. For example, protocol extension schema 162 can define data formats for one or more data fields specific to a first message protocol (e.g., Network News Transfer Protocol ("NTTP")) and protocol extension schema 163 can define data formats for one or more data fields specific to a second message protocol (e.g., another electronic mail protocol, such as, Post Office Protocol 3 ("POP3"), or another type of protocol altogether, such as a fax transport protocol). Protocol extension schemas can be arranged in a hierarchy. For example, protocol extension schema 164 can define data formats for additional data fields specific to a particular implementation of the first message protocol (having data fields defined in accordance with protocol extension schema 162).

Other message extensions can be application extensions that promote compatibility with specified message applications. For example, message application extension schemas 166 can contain one or more message application extension schemas defining data fields that are specific to message applications. For example, application extension schema 167 can define data formats for one or more data fields specific to a first message application (e.g., an electronic mail application) and application extension protocol schema 168 can define data formats for one or more data fields specific to a second message application (e.g., a PC-based fax application). Application extension schemas can be arranged in a hierarchy. For example, application extension schema 169 can define data formats for additional data fields specific to a particular version of the second message application (having data fields defined in accordance with application extension schema 168).

Thus, a message item having data fields defined in accordance with message schema 152 can also have additional data fields defined in accordance with any of the extension schemas in message protocol extension schemas 161 and message application extension schemas 166. Data fields corresponding to message extensions can be "snapped" on to and removed from message items as appropriate to facilitate compatibility with existing message protocols and message applications. Accordingly, the configuration of data fields contained in a message item can change over time.

An application, such as, for example, message application 111 or message application 103, may request that data fields of a particular protocol extension schema or application extension schema be snapped on to or removed from a message item before accessing the message item. Thus, it may be that a message item is transformed for compatibility with a particular message protocol or message application. For example, message application 103 may request that fields of the NNTP protocol extension schema be snapped onto message item 116. Accordingly, message application 103 can retrieve message item 116 and transform message item 116 to include data fields (e.g., defined in accordance with protocol extension schema 162) that promote compatibly with the NNTP protocol. The transformed message item (e.g., message item 107) can then be transferred to computer system 102.

It may be that message application 111 automatically retrieves values from one or more currently assigned data fields to populate one or more values of newly added data fields corresponding to a message extension schema. Retrieving values can include referring or linking to information defined in accordance with other schemas in schema hierarchy 150. For example, a message application 111 for processing electronic mail may be used to create a message that is addressed to one or more fax recipients, instead of, or in addition to, one or more e-mail recipients. The application 111 may attach an email application extension to the message item in accordance with a corresponding message application extension schema 166. At the same time, the application 111 may attach a fax protocol extension to the message item in accordance with the message protocol extension schema 161 for the fax transport protocol used to deliver the message to the intended fax recipient. At the recipient (destination) there may be a conventional fax machine or a computer running an email application similar to the one that was used to create the message. In the latter case, because the message item is extended with the email application extension, the message can be displayed to the user like an email message in the email application (such as Outlook) even though it was delivered as a fax message. The email application 111 might even be able to distinguish between messages delivered via fax versus those delivered via email using, for example, a fax or email message icon, depending on the type of message protocol extension schema 161 used to extend the message item, as appropriate.

Continuing with the example, the email application 111 may store the content of the message differently for messages delivered via fax as opposed to messages delivered via email in accordance with a content schema 156. For instance, the body of a received fax message may be stored as a tiff image. The tiff content may be displayed in different ways in different message applications 111. For example an email application such as Microsoft's Outlook may choose to display the tiff image (i.e., the body of received fax message) inline within Outlook's read window, whereas other message applications might display the .tiff images in a separate image browser window. Alternatively, or in addition, the message application 111 may prompt a user to enter values for populating newly added data fields corresponding to a message extension.

FIGS. 2A-2F illustrate an example of a more detailed schema hierarchy 200 in accordance with the principles of the present invention. Depicted in FIG. 2A, schema hierarchy 200 includes base item schema 210. Base item schema 210 includes interrelated fields 211 that define data formats for representing base item data. More specifically, interrelated fields 211 can define data formats as described in Table 1.

TABLE 1

| Field Name | Field Data Type | Field Description |
| --- | --- | --- |
| ItemID | GUID | Defines a format for representing a globally unique identifier for a database item. |
| Created | DateTime | Defines a format for indicating the date and time a database item, having a globally unique identifier defined in accordance with the ItemID field, was created. |
| DisplayName | String | Defines a format for indicating a descriptive name for a database item having a globally unique identifier defined in accordance with the ItemID. |

Figure 2A:
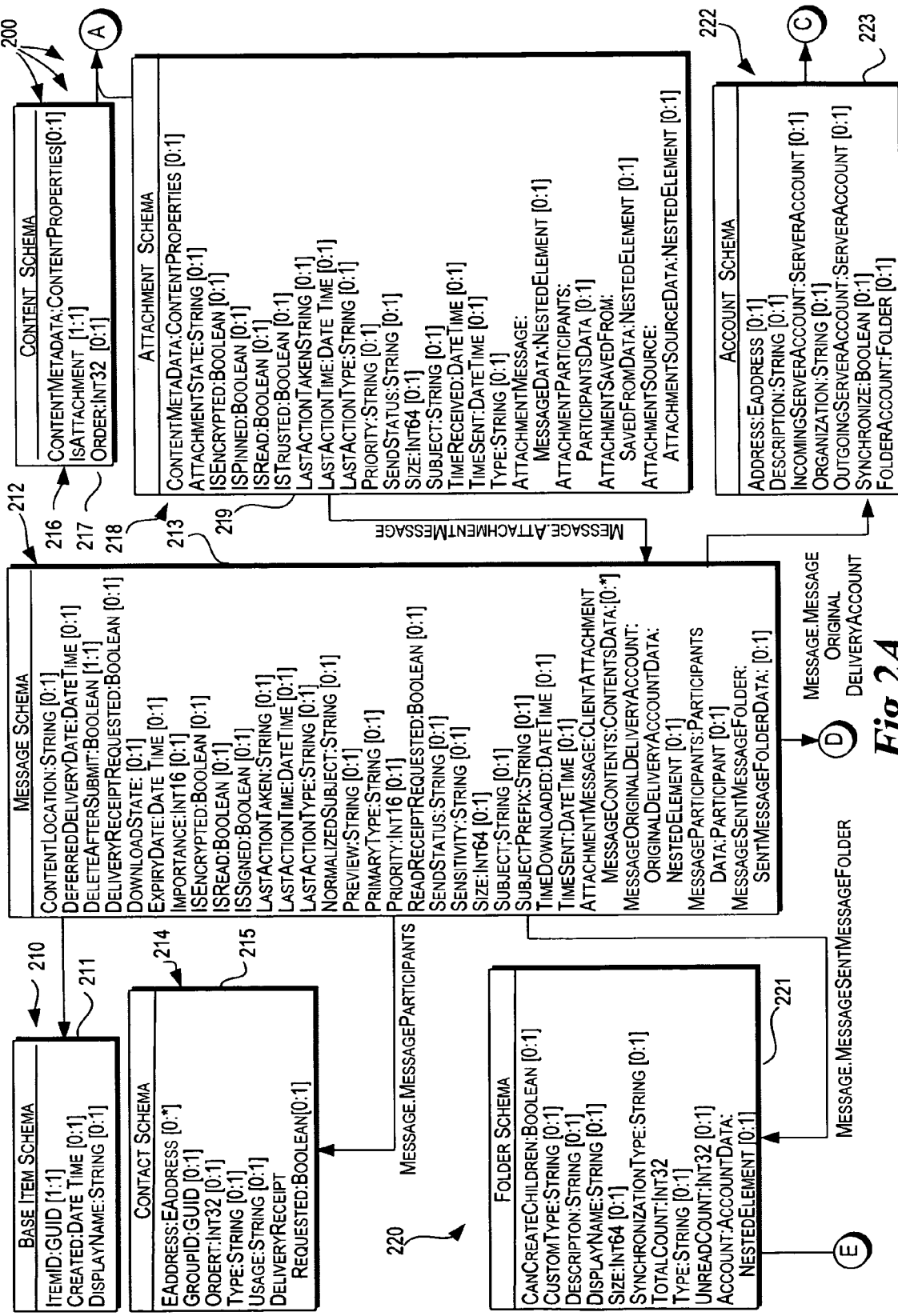
FIG. 2A illustrates a first portion of an example of a more detailed schema hierarchy formed in accordance with the principles of the present invention.

Depicted in FIG. 2A, schema hierarchy 200 includes message schema 212. Message schema 212 derives from base item schema 210 and also includes interrelated fields 213 that define data formats for representing a message item. The fields of message schema 212 can be applied to a base item having a globally unique identifier (defined in base item schema 210) to cause the base item to exhibit the properties of a message item. More specifically, interrelated fields 213 can define data formats as described in Table 2.

TABLE 2

| Field Name | Field Data Type | Field Description |
| --- | --- | --- |
| ContentLocation | String | Defines a format for representing referenced content from a message's Content-Location header. This field can be used along with the base Content-Location. Some attachments will have relative Content-Locations to this Content-Location. |
| DeferredSendTime | DateTime | Defines a format for representing the date and time when the message is to be sent. |
| DeleteAfterSubmit | Boolean | Defines a format for indicating whether the message should be deleted after being submitted for delivery. |
| DownloadState | String | Defines a format for representing the different phases of downloading the message from the server. Partial, etc. |
| ExpiryDate | DateTime | Defines a format for representing the date and time when the content of the message expires. In general, no automatic action is implied. |

TABLE 2-continued

| Field Name | Field Data Type | Field Description |
| --- | --- | --- |
| Importance | Int16 | Defines a format for representing the message sender's opinion of the importance of the message. Corresponds with the "Importance:" field in SMTP. Possible values are 1 ("Low"), 2 ("Normal"), and 3 ("High"). The default value for new messages is 2 ("Normal"). |
| IsEncrypted | Boolean | Defines a format for indicating if the message is encrypted. |
| IsRead | Boolean | Defines a format for indicating if the message has been marked as read by the user. |
| IsSigned | Boolean | Defines a format for indicating if the message has been signed. |
| LastActionTaken | String | Defines a format for representing the last action taken on the message. Possible values are: Replied and Forwarded. |
| LastActionTime | DateTime | Defines a format for representing the date and time at which the last action was taken on the message. |
| LastActionType | String | Defines a format for representing the type of last action taken on this message. Should be interpreted together with LastActionTaken. Examples are: Fax or Email to mark that we replied by fax or email. |
| NormalizedSubject | String | Defines a format for representing the normalized subject of the message. The NormalizedSubject is the part the subject following the prefix. If there is no prefix, NormalizedSubject is the same as the subject. |
| Preview | String | Defines a format for representing a preview of the message. The preview property can contain the first few characters of the main message body, or some representation of it that will be used for previewing the message. This is cache-optimization field. It is calculated form the bodies and is put here for fast retrieval in preview scenarios. It is text only field and is not mandatory. |
| PrimaryType | String | Defines a format for representing a message type (e.g., Email, FaxMessage, InstantMessage, VoiceMessage, MeetingRequest, etc.) associatd with the message. The message type will imply behavior of the message. Applications can customize icons and read custom headers based on the message type. This value can come from the X-MessageType header. |
| Priority | Int16 | Defines a format for representing a message priority for the message. Message priority for delivery as set by application. Values: AboveNormal = 3, Normal = 2, BelowNormal = 1. Higher values indicate that a transport should deliver it sooner than messages of a lower level. |
| ReadReceiptRequested | Boolean | Defines a format for indicating if read receipt has been requested for this message. |
| SendStatus | String | Defines a format for representing a send status of the message. "ToSend": Compose UI marks this way for transports to pick up. "Sending": A transport transitions from "ToSend" to "Sending" so other transports won't also attempt to send the message. "Sent": The transport transitions from "Sending" to "Sent" after the send is complete. |
| Sensitivity | String | Defines a format indicating the message sender's opinion of the sensitivity of the message. Corresponds with the "Sensitivity:" field in SMTP. Possible values are: None (no special sensitivity), Personal, Private, or Company-Confidential. The default value for new messages is None. |
| Size | Int64 | Defines a format for representing the calculated size of the message in bytes. This includes the entire message with body, header and attachments. The value can be missing if the size is unknown. |
| Subject | String | Defines a format for representing the subject of the message. For example, one line that describes the topic of the message. This field is calculated from NormalizedSubject and SubjectPrefix. Subject of the message. Subject can be computed from the Subject and SubjectPrefix values in the following manner: (1) If SubjectPrefix is present, Subject is set to the contents of the NormalizedSubject with the prefix prepended. (2) If SubjectPrefix is not present, NormalizedSubject is copied to Subject. |

TABLE 2-continued

| Field Name | Field Data Type | Field Description |
| --- | --- | --- |
| SubjectPrefix | String | Defines a format for representing a SubjectPrefix of the message. Consists of one or more alphanumeric characters, followed by a colon and a space (which are part of the prefix). The subject prefix may be absent. If SubjectPrefix is set expressly, it can be of any length and use any alphanumeric characters and can match a substring at the beginning of the subject. If SubjectPrefix is not expressly set and must be computed by, its contents can be more restricted. One possible rule for computing the prefix is that the subject begin with one, two, or three letters (alphabetic only) followed by a colon and a space. If such a substring is found at the beginning of the subject, it then becomes SubjectPrefix (and also stays at the beginning of the Subject field). Otherwise SubjectPrefix remains unset. |
| TimeDownloaded | DateTime | Defines a format for representing the date and time the message was downloaded from the server. |
| TimeReceived | DateTime | Defines a format for representing the date and time the message was delivered. The TimeReceived property describes the time the message was received by the server, rather than the time the message was downloaded from the server and placed in the local store. This value can be omitted on draft messages and retained copies of send messages. |
| TimeSent | DateTime | Defines a format for representing the date and time the message sender submitted the message. On draft messages this value can be omitted - it may be set when the message is submitted. |
| AttachmentMessage | Attachment | Defines a format for representing a link to attachment data corresponding to the message. The attachment data can be defined in accordance with an attachment schema. |
| MessageContents | ContentsData | Defines a format for representing link to a portion of message content corresponding to the message. The portion of message content can be defined in accordance with a content schema. |
| MessageOriginalDeliveryAccount | OriginalDeliveryAccountData | Defines a format for representing a link to original delivery account data corresponding to the message. The original delivery account data can be defined in accordance with an account schema. |
| MessageParticipants | ParticipantsData | Defines a format for representing a link to contact data corresponding to the message. Contact data can be defined in accordance with a contact schema. The contact data can represent a collection of users who participated in the message exchange. This includes, senders, receivers, people copied (Cc), etc. A participant is a link to the Contact Item representing message sender/receiver. May be left dangling in which case the fields on this type contain all the necessary data about the participant. |
| MessageSentMessageFolder | SentMessageFolderData | Defines a format for representing a link to a folder item corresponding to the message. The folder item can be defined in accordance with a Folder Schema. This field specifies a link to a folder the message can be moved to after being submitted for delivery. |

Depicted in FIG. 2A, schema hierarchy 200 includes contact schema 214. Contact schema 214 includes interrelated fields 215 that define data formats for representing a contact item. A message item defined in accordance with message schema 212 can include a link to a contact item defined in accordance with contact schema 214. A participant can be a link to a contact item representing a message sender, receiver, etc. A participant link may be left dangling in which case the fields on this type contain all the necessary data about the participant. More specifically, interrelated fields 215 can define data formats as described in Table 3.

TABLE 3

| Field Name | Field Data Type | Field Description |
|---|---|---|
| Eaddress | EAddress | Defines a format representing one or more electronic addresses corresponding to a message participant. This field can represent electronic addresses of the message participant (e.g., of a message defined in accordance with a message schema). It is used for User name and address information. It can be omitted for private DLs case. It is multivalued for legacy DN case. A contact can include multiple EAddress fields. |
| GroupID | GUID | Defines a format for representing a participant group identifier. This field can support RFC 2822 recipient group syntax. This is a way to group recipients to a specific display name including handling two groups with the same name. |

TABLE 3-continued

| Field Name | Field Data Type | Field Description |
|---|---|---|
| Order | Int32 | Defines a format for representing an order corresponding to the participant. User interfaces can take this value into consideration when displaying the order of the participants to the user. |
| Type | String | Defines a format for representing a type of entity corresponding to the participant (individual, organization, and corporation). This is a free form string as people can add other values here. |
| Usage | String | Defines a format for representing the participants usage of a message. Possible Values: From, To, Cc, Bcc, Sender, ReplyTo, ReceivedRepresenting, TransportSender. It can also contain other values. An application is not required to understand all kinds of values for this field. Some may apply only to Email, some only to IM messages, etc. |
| DeliveryReceiptRequest | Boolean | Defines a format for indicating if delivery receipt has been requested for the participant. |

Depicted in FIG. 2A, schema hierarchy 200 includes folder schema 220. Folder schema 220 includes interrelated fields 221 that define data formats for representing a folder item. A message item defined in accordance with message schema 212 can include a link to a folder defined in accordance with folder schema 220. More specifically, interrelated fields 221 can define data formats as described in Table 4.

TABLE 4

| Field Name | Field Data Type | Field Description |
|---|---|---|
| CanCreateChildren | Boolean | Defines a format for indicating if a folder can include child folders. A server may not want or permit the folder to have child folders. IMAP indicates this by returning '\Noinferiors' in the named attributes for the IMAP LIST response. |
| CustomType | String | Defines a format for representing a custom type corresponding to the folder. This contains a GUID or other custom type uniquely identifying the type of folder. This can be used for "SpecialOffers", "Errors", "PreProcessing", or other custom folder indicators that occur to frequently to be added to the Type category. |
| Description | String | Defines a format for represent a description of the folder. |
| DisplayName | String | Defines a format for representing a display name of the folder. The Name of the folder can be unique among it's peers but the DisplayName doesn't have database code to require that it be unique. |
| Size | Int64 | Defines a format for representing the calculated size of the folder in bytes. This can includes the entire body, header and attachments of message in the folder. The value can be omitted if the size is unknown |
| SynchronizationType | String | Defines a format for representing how folder is synchronized. Most frequently used for IMAP, NNTP, and DAV accounts. Values: All: Synchronize the folder completely. Headers: Synchronize the headers New: Synchronize new items. |
| TotalCount | Int32 | Defines a format for representing the total number of messages in the folder. |

TABLE 4-continued

| Field Name | Field Data Type | Field Description |
| --- | --- | --- |
| Type | String | Defines a format for representing a special designation since some folders can be treated in a special way. For example, a RemoteRoot should not have more than one InboxPrimary. However, it can have more than one Inbox. Values: [These can map to a folder that is the root of an email account.] 1) RemoteRoot: This folder and it's children map 1 to 1 to an account that mirrors folders and messages from the server. (Example: IMAP) 2) LocalRoot: A folder that doesn't map 1-to-1 to an account that mirrors folders and messages from the server. [These can map to a folder that is the root of an email account.] 3) Inbox: This folder is designated as being the "Inbox". 4) Outbox: This folder is designated as being the "Outbox". 5) Sent: This folder is designated as being the "Sent". 6) Deleted: This folder is designated as being the "Deleted". 7) Drafts: This folder is designated as being the "Drafts". 8) Junk: This folder is designated as being the "Junk". |
| UnreadCount | Int32 | Defines a format for representing the number of unread messages in the folder. This accounts only for the Message items in this folder. |
| Account | AccountData | Defines a format for representing a link to account data. Account data can be defined in accordance with an Account schema. |

Depicted in FIG. 2A, schema hierarchy 200 includes content schema 216. Content schema 216 includes interrelated fields 217 that define data formats for representing a portion of content associated with a message item. A message item defined in accordance with message schema 212 can include a link to a portion of content (e.g., a body or attachment) defined in accordance with content schema 216. This can be a link to a document, an event, or some other portion of content. A message item can have multiple portions of content (e.g., multiple bodies and/or attachments). For example, a multipart MIME message can contain multiple bodies.

As another example, a fax message can contain a message body and one or more cover pages stored as one or more tiff images Thus, a message item that represents a fax message can include a link to one or more .tiff images defined in accordance with a content schema 216. In one embodiment, the link is derived from the message content relationship in message schema 212. The .tiff images may then be easily displayed in different ways in different message applications 111. For example, an email application, such as Microsoft's Outlook, may choose to display the tiff image (i.e., the body of a received fax message) inline within Outlook's read window, whereas other message applications might display the .tiff images of the fax transmission in a separate image browser window. Additional details about the fax transmission may be represented in a fax protocol schema 235 as described in further detail below with reference to FIG. 2E.

The interrelated fields 217 of the content schema 216 can define data formats for representing the one or more portions of content of a message as described in Table 5.

TABLE 5

| Field Name | Field Data Type | Field Description |
| --- | --- | --- |
| ContentMetadata | ContentProperty | Defines a format for representing content properties of a portion of content (e.g., a message body or attachment). ContentProperty types contain fields that describe the content of a message. ContentProperty types define a relationship between a message and an item representing the portion of content, such as an extension for a message body or an attachment. |
| IsAttachment | Boolean | Defines a format for indicating whether the portion of content referred to is a body, or attachment for a message. This field represents how the application views the content as opposed to the content disposition field in the message stream, which represents a suggestion from MIME of how to view the content. |
| Order | Int32 | Defines a format for representing an order for the portion of content. This value provides an order to the bodies and attachments. User interfaces should take this value into consideration when displaying the order of the attachments to the user. The first body can be the preferred one. |

Depicted in FIG. 2A, schema hierarchy 200 includes attachment schema 218. Attachment schema 218 includes interrelated fields 219 that define data formats for representing an attachment associated with of a message item. An attachment defined in accordance with attachment schema 218 can include a link to a message item defined in accordance with message schema 212. More specifically, interrelated fields 219 can define data formats as described in Table 6.

TABLE 6

| Field Name | Field Data Type | Field Description |
| --- | --- | --- |
| ContentMetadata | ContentProperties | Defines a format for representing content properties of an attachment. ContentProperty types contain fields that describe the attachment. It is on a relationship between message and item representing content on extension for attachment. |
| AttachmentState | String | Defines a format for indicating the type and behavior of the attachment. Values can include: 1) EnclosedAttachment: This value indicates an attachment that is stored decoded outside of the Mime. The attachment will behave as if it is enclosed within the Mime Stream. This database Item was created because the data is to be stored in decoded form or the properties need to be schematized. The two most common scenarios that require this are: A. Some protocols will download attachments outside of the MIME content in decoded form. B. The attachment data or meta properties need to be accessible, but this attachment may not behave as if the sender attached this document/file for the recipient to use directly. Examples include: Signature blobs, Inline Only Attachments, Digital Signature certs or data. 2) PromotedAttachment: This attachment is promoted to act like a peer of the message. It will appear in the shell along side the message. 3) SavedAsAttachment: This attachment has be 'Saved As', so it will act as a copy of the message. |
| IsEncrypted | Boolean | Defines a format for indicating if the attachment is encrypted. |
| IsPinned | Boolean | Defines a format for indicating if the attachment is pinned, meaning it will continue to exist when the message is deleted. If the attachment is not pinned, the following can happen: 1. When the Message is deleted, the Attachment is deleted. 2. When the Attachment item is deleted, any information or metadata associated with the Attachment is deleted from the message. (To save space or for privacy) |
| IsRead | Boolean | Defines a format for indicating if a message linked to the attachment has been marked as read by the user. |
| IsSigned | Boolean | Defines a format for indicating if a message linked to the attachment is signed. |
| IsTrusted | Boolean | Defines a format for indicating if a message linked to the attachment has satisfied the user's security preferences to appear along with their other files. If security preferences are satisfied, the attachment has met the user's criteria to not need to display warning user interface. The criteria could be: the attachment content, the sender is approved, or user interface as already been displayed. On the other hand, if security preferences are not satisfied, a security preferences warning user interface should be shown to the user before the attachment is opened. This will inform the user that the content could have came from an untrusted source and may contain harmful contents. |
| LastActionTaken | String | Defines a format for representing the last action taken on a message linked to the attachment. Possible values are: Replied and Forwarded. |
| LastActionTime | Dateline | Defines a format for representing the date and time the last action was taken on a message linked to the attachment. |

TABLE 6-continued

| Field Name | Field Data Type | Field Description |
| --- | --- | --- |
| LastActionType | String | Defines a format for representing the type of last action taken on a message linked to the attachment. Should be interpreted together with LastActionTaken. Examples are: Fax or Email to mark that we replied by fax or email. |
| Priority | String | Defines a format for representing a priority of a message linked to the attachment Attachment priority for delivery can be set by application. Possible Values: AboveNormal, Normal, BelowNormal. Higher values indicate that a transport should deliver attachment sooner than items of a lower level. |
| SendStatus | String | Defines a format for representing the send status of the attachment. For example, a UI can mark the attachment "ToSend" for transports to pick up. A UI can mark the attachment as "Sending" indicating a transition from "ToSend" to "Sending" so other transports won't also attempt to send the message. A UI can mark an attachment as "Sent": The transport transitions from "Sending" to "Sent" after the send is complete. |
| Size | Int64 | Defines a format for representing the size of a message (including attachments) linked to the attachment. |
| Subject | String | Defines a format for representing the subject of a message linked to the attachment. For example, one line that describes attachment. |
| TimeReceived | DateTime | Defies a format for representing the date and time the attachment was delivered. The TimeReceived property describes the time a message linked to the attachment was received by the server, rather than the time the attachment was downloaded from the server and placed in the local database store. This value can be omitted on draft messages and retained copied of send messages. |
| TimeSent | DateTime | Defines a format for representing the date and time a message linked to the attachment was submitted. On draft messages this value can be missing - it will be set when the message is submitted. |
| Type | String | Defines a format for representing the type of a message linked to the attachment. The type will imply a behavior of the linked message. The application can customize icons and read custom headers based on the type. This value can come from the X-MessageType header. |
| AttachmentMessage | MessageData | Defines a format for representing a link to a message item associated with the attachment. The message item can be defined in accordance with a message schema. |
| AttachmentParticipants | ParticipantsData | Defines a format for representing a collection of users who participated in exchanging a message linked to the attachment. This includes, senders, receivers, people copied (Cc), etc. |
| AttachmentSavedFrom | SavedFromData | Defines a format for representing a link to allocation the attachment was saved from. Users may use a User Interface to 'Save As' a copy of the attachment. Doing so can make a copy of the attachment. If this value is is included then the attachment is a 'Saved As' copy of an original attachment. The destination of this link is the original attachment. |
| AttachmentSource | AttachmentSourceData | Defines a format for representing the source of the attachment. If the attachment was composed and this link has a value, then the link points to the database item where the attachment came from. |

Depicted in FIG. 2A, schema hierarchy 200 includes account schema 222. Account schema 222 includes interrelated fields 223 that define data formats for representing an account item. A message item defined in accordance with message schema 212 (or folder item defined in accordance with folder schema 220) can include a link to an account item defined in accordance with account schema 219. An account item can include a message account and settings. More specifically, interrelated fields 223 can define data formats as described in Table 7.

TABLE 7

| Field Name | Field Data Type | Field Description |
| --- | --- | --- |
| Address | Eaddress | Defines a format for representing one or more EAddresses that map to this account. This collection should be ordered and the order is significant. The first Eaddress is primary (used for From field population). |
| Description | String | Defines a format for representing a description on the account. |
| IncomingServerAccount | ServerAccount | Defines a format for representing a server that is capable of receiving messages for the account. Bidirectional servers duplicate their information in both the incoming and outgoing account. |
| Organization | String | Defines a format for representing an organization associated with the account. |
| OutgoingServerAccount | ServerAccount | Defines a format for representing a server that is capable of sending messages for the account. Bidirectional servers duplicate their information in both the incoming and outgoing account. |
| Synchronize | Boolean | Defines a format for indicating if the account is to be synchronized with the server. A user may desire to skip having the account synchronized unless the user specifically requests it. |
| FolderAccount | Folder | Defines a format for representing a link to a folder item that points to this account. A folder item can be defined in accordance with a folder schema. |

Figure 2B:
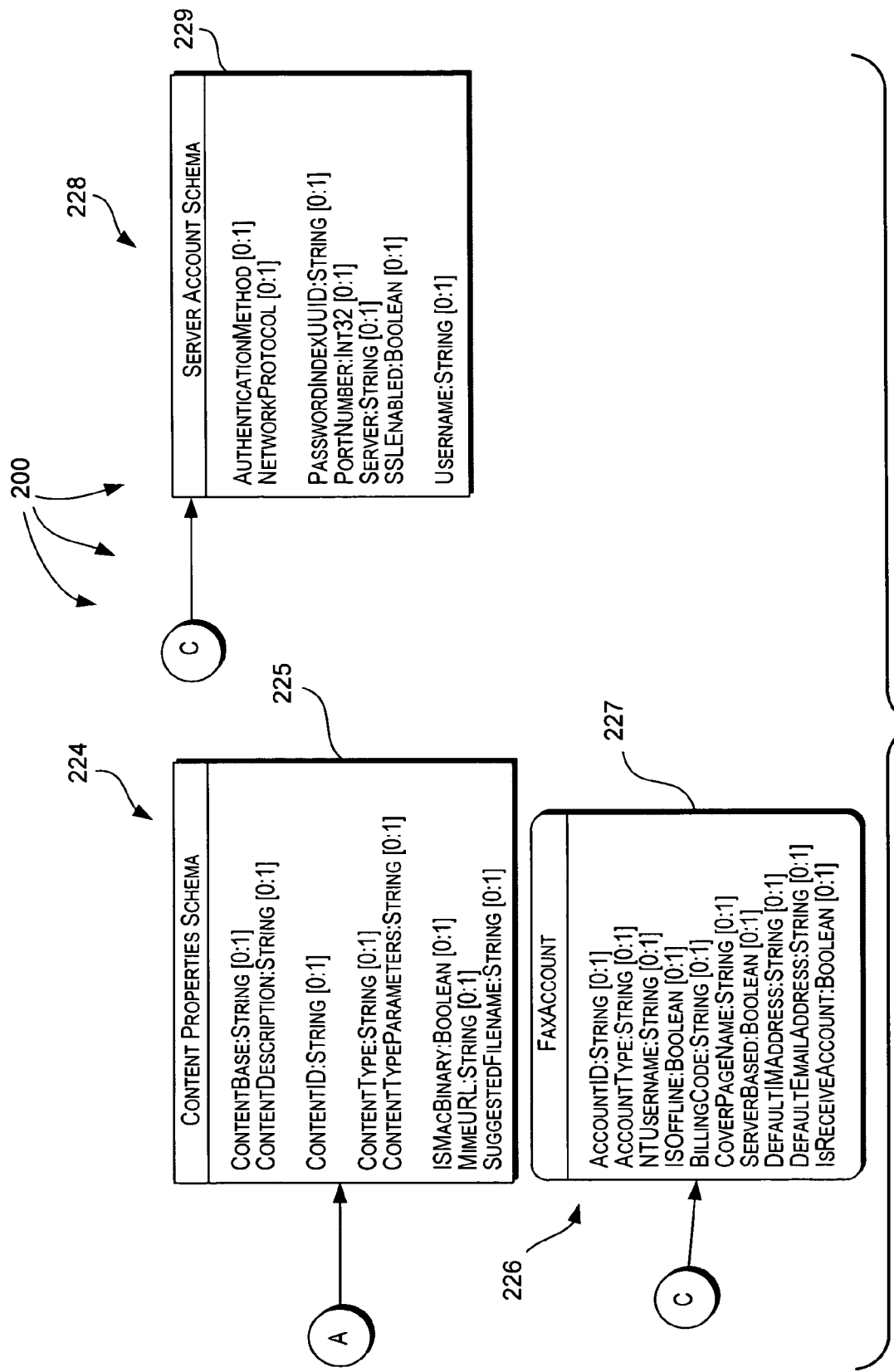
FIG. 2B illustrates a second portion of an example of a more detailed schema hierarchy including details of a fax schema formed in accordance with the principles of the present invention.

Depicted in FIG. 2B, schema hierarchy 200 includes content properties schema 224. Content properties schema 224 includes interrelated fields 225 that define data formats for representing content properties. Content properties contain fields that describe the content of a message. Content properties are used on relationships between a message item and a portion of content (e.g., defined in accordance with content schema 216) or on an extension for an attachment (e.g., defined in accordance with attachment schema 218). More specifically, interrelated fields 225 can define data formats as described in Table 8.

TABLE 8

| Field Name | Field Data Type | Field Description |
| --- | --- | --- |
| ContentBase | String | Defines a format for representing a content base of the content. ContentID, ContentBase, and ContentLocation allow referencing between MIME sections. This can be used to allow URLs in HTML bodies to reference attached content. |
| ContentDescription | String | Defines a format for representing a description that may accompany the content. For electronic mail messages, this value may have come from the Content-Description: header. Some legacy clients use Content Description for the recommended filename. |
| ContentID | String | Defines a format for representing a content entity ID of the content. Content-ID, Content-Base, and Content-Location allow referencing between MIME sections. This can be used to allow URLs in HTML bodies to reference attached content. |
| ContentType | String | Defines a format for representing a Content-Type of the content. For electronic mail messages, this can match the Content-Type header field for the MIME section where the attachment came from. For other types of electronic messages, this content type can best match the content. For example: The Content-Type could be 'audio/mp3' and the MessageContent could point to an Item in a Music schema, or to a .mp3 file containing, or to another Item that stores music data. Thus, the Content-Type give a standard indication of the data. This is a free form string. Applications can put their own types here, not just 'text/html' and other mime content types. |

TABLE 8-continued

| Field Name | Field Data Type | Field Description |
| --- | --- | --- |
| ContentTypeParameters | String | Defines a format for representing parameters in the Content-Type header. Parameters are of the format 'attribute = value' and can be separated by a ';'. May contain a filename. |
| IsMacBinary | Boolean | Defines a format for indicating whether the attachment is a Mac Binary. This can facilitate special processing for Mac binaries. |
| MimeURL | String | Defines a format for representing a MIME path. A MimePath: URL of the form: MimePath:///[Level 1]:[MultiPart-Type]/[Level2]:[MultiPart-Type]/.../[Level n]:[MultiPart-Type] |
| SuggestedFileName | String | Defines a format for representing the filename that is recommended to go with the cotnent. The path can be omitted and this may just include the filename. For electronic mail messages, this value may have come from the Content-Type: 'name' parameter or the Content-Disposition-Filename or another location in the original email message. For example: 'Bill in Florida 2004.jpg' |

Depicted in FIG. 2B, schema hierarchy 200 includes server account schema 228. Server account schema 228 includes interrelated fields 229 that define data formats for representing server accounts. Server account data defined in accordance with server account schema 228 can extend an account (e.g., defined in accordance with account schema 222) for compatibility with a particular server. A server account schema can be used to describe a server account for a client account. More specifically, interrelated fields 229 can define data formats as described in Table 9.

TABLE 9

| Field Name | Field Data Type | Field Description |
| --- | --- | --- |
| AuthenticationMethod | String | Defines a format for representing an authentication method for a server. This collection is ordered and the first entry is the preferred one. |
| NetworkProtocol | String | Defines a format for representing a network protocol used to send and receive from the server. Values, POP3, IMAP, NNTP, DAV.Hotmail, DAV.Exchange, etc. |
| PasswordIndexUUID | String | Defines a format for representing an index into a password store for the server. To enhance security, passwords can be stored outside of the database in a password store. This UUID will allow indexing into the password store. |
| PortNumber | Int32 | Defines a format for representing a port number to use when contacting the server. |
| Server | String | Defines a format for representing a hostname or URL indicating the server. |
| SSLEnabled | Boolean | Defines a format for indicating if SSL is to be used when connecting to the server. |
| UserName | String | Defines a format for representing a username to use when logging into the server. |

Depicted in FIG. 2B, schema hierarchy 200 includes fax account schema 226. Fax account schema 226 includes interrelated fields 227 that define data formats for representing a fax account and settings. Fax account data defined in accordance with fax account schema 226 can extend an account (e.g., defined in accordance with account schema 222) for compatibility with a particular fax service. A fax account schema can be used to describe a fax account for a client account. More specifically, interrelated fields 227 can define data formats as described in Table 10.

TABLE 10

| Field Name | Field Data Type | Field Description |
| --- | --- | --- |
| AccountID | String | Defines a format for representing a unique ID with which a fax service can identify an account. This ID may be used by the client for querying information about fax accounts. |
| AccountType | Int16 | Defines a format for representing the type of the account. There are five types - local modem account, MFP account, shared fax service account, exchange server account, and an Internet FSP account. |

TABLE 10-continued

| Field Name | Field Data Type | Field Description |
| --- | --- | --- |
| NTUserName | String | Defines a format for representing the NT user name associated with this account, having a format such as domainName\userName. For local users, the domain name is the machine name. The NT user name is used to identify a fax account for display purposes, so there is no need for a separate string identifier. |
| IsOffline | Boolean | Defines a format for representing a flag that indicates whether the mode of the account, i.e., whether the account is offline. True if the account is in offline mode from the client. In the context of a fax transmission, the offline feature is supported per account and per client machine, but not per mail client. Accordingly, when the same account is configured from multiple mail clients on the same machine, both mail clients will be in the same mode - either online or offline. |
| BillingCode | String | Defines a format for representing a billing code associated with the account. The billing code may be used to assign costs of faxing documents to a specific department in an organization, or other entity to which the billing code corresponds. |
| CoverPageName | String | Defines a format for representing the name of the default cover page to be used for messages sent using this account. |
| ServerBased | Boolean | Defines a format for representing a flag indicating whether the default cover page is server-based. |
| DefaultIMAddress | Eaddress | Defines a format for representing a default IM address for the IM type delivery receipt |
| DefaultEmailAddress | Eaddress | Defines a format for representing a default email address for the email type delivery receipt |
| IsReceiveAccount | Boolean | Defines a format for representing a flag indicating whether this is the account on which all of the faxes are received by default |

Figure 2C:
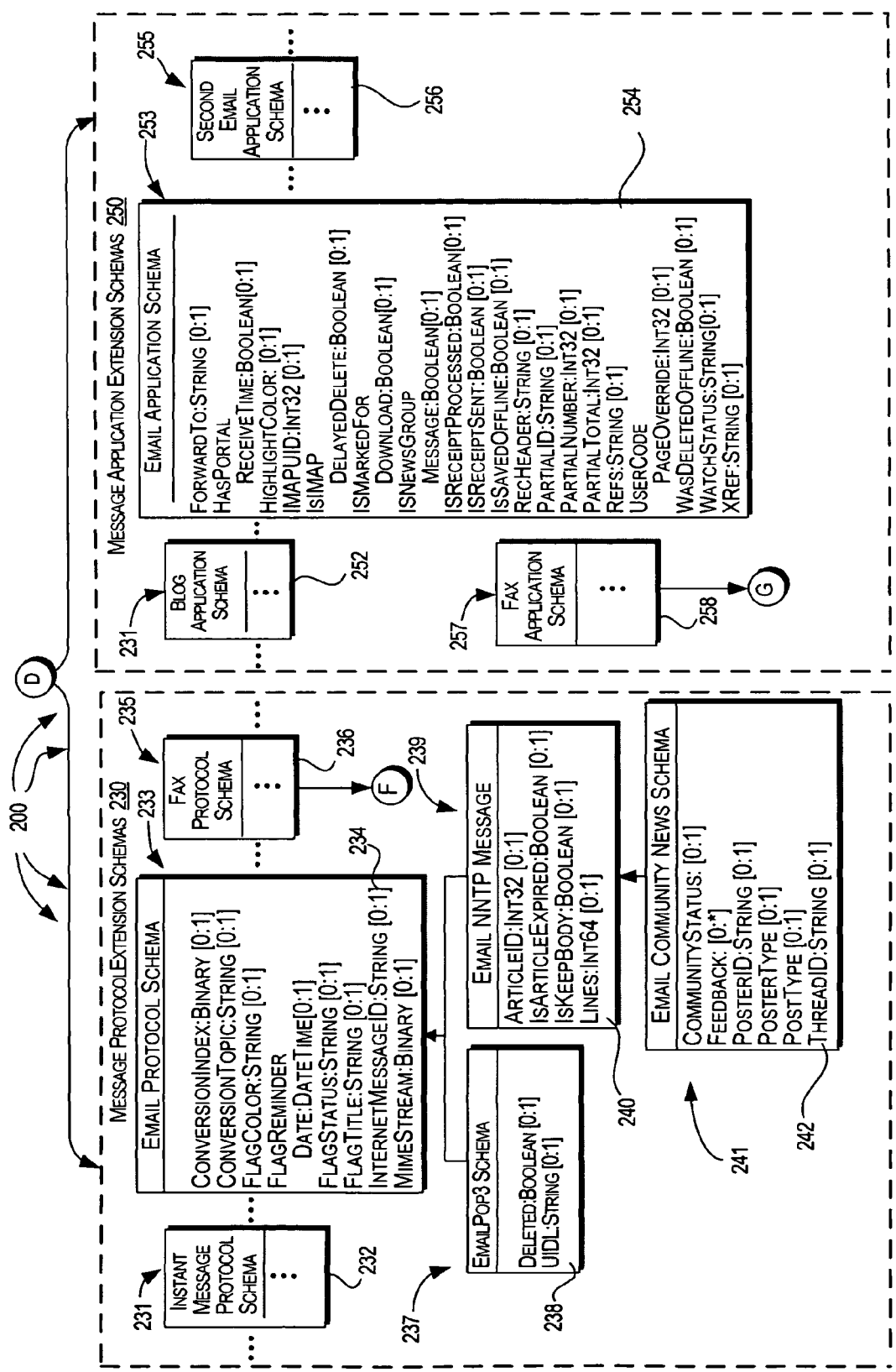
FIG. 2C illustrates a message extension portion of an example of a more detailed schema hierarchy in accordance with the principles of the present invention.

Depicted in FIG. 2C schema hierarchy 200 includes a plurality of message extension schemas including message protocol extension schemas 230 and message application extension schemas 250. Message protocol extension schemas 230 includes a plurality of protocol extension schemas that can be utilized to extend a message item for compatibility with a plurality of corresponding message protocols. For example, message protocol extension schemas 230 includes instant message protocol schema 231, E-mail protocol schema 233, and Fax protocol schema 235, that can promote compatibility with an instant message, electronic mail, and fax protocol respectively. The ellipses before, between, and after the schemas expressly depicted in message protocol extension schemas 230 indicates that message protocol extension schemas 230 can include additional schemas (e.g., for extending message items for compatibility with voice message protocols, Blog entry protocols, etc.).

Vertical ellipses 232 and 236 indicate that instant message protocol schema 231 and fax protocol schema 235 respectively can each contain one or more interrelated data fields. The one or more interrelated data fields can be utilized to extend a message item for compatibility with a corresponding message protocol. For example, e-mail protocol schema 233 includes interrelated fields 234 that can be utilized to extend a message item (e.g., defined in accordance with message schema 212) for compatibility with an electronic mail protocol. More specifically, interrelated fields 234 can define data formats as described in Table 11.

TABLE 11

| Field Name | Field Data Type | Field Description |
| --- | --- | --- |
| ConversationIndex | Binary | Defines a format for representing the relative position of this message within a conversation thread. The ConversationIndex can be implemented using concatenated time stamp values. A conversation view is created by grouping the message list by ConversationTopic and sorting within each group by ConversationIndex |
| ConversationTopic | String | Defines a format for representing a conversation thread represents corresponding to series of messages and replies. The ConversationTopic value is set for the first message in a thread, for example, to the NormalizedSubject. Subsequent messages in the thread can use the same ConversationTopic without modification. |

TABLE 11-continued

| Field Name | Field Data Type | Field Description |
| --- | --- | --- |
| FlagColor | String | Defines a format for representing the color of a flag. |
| FlagReminderDate | String | Defines a format for representing the date and time the requested action is due. |
| FlagStatus | String | Defines a format for representing whether the message has been flagged by the user. Possible values include None, Marked, and Complete. This categorization may be extended based on application requirements. |
| FlagTitle | String | Defines a format for representing the text of the flag on the message. |
| InternetMessageID | String | Defines a format for representing an Internet message ID of the message. Can correspond with the RFC 2822 "Message-ID:" field in SMTP. The value can be omitted on newly-created and draft messages. |
| MimeStream | Binary | Defines a format for representing the mime encoded content for the message. The MimeContent represents the uninterpreted form of the message content. The message stream can be parsed and stored as fields (Message type, Body, Attachments, etc.). Certain kinds of custom infrequently used information will exist only in the MimeStream, such as: 'X-' headers, some mime section headers, text pre or post boundries, redundant attachment filenames (Content-Type: 'Name', Content-Type-Disposition-Filename, etc.), among others. The original MimeStream can also be used to check of digital signatures or attempting to decode with a different char-set. This field can be of FileStream type. |
| ShowPaperClip | Boolean | Defines a format for indicating if the message contains a significant attachment that warrants showing a paper clip for the message in UI. It can be calculated by a complex application-specific algorithm. For example, it accounts for attachments, but not Inline attachments and signature blobs. |

Further detailed description of an example of a fax protocol schema 235 is set forth with reference to FIG. 2E below. The fax protocol schema 235 includes interrelated fields 236 that can be utilized to extend a message item (e.g., defined in accordance with message schema 212) for compatibility with a particular fax transport protocol.

Depicted in FIG. 2C, e-mail POP3 schema 237 derives from e-mail protocol schema 233 and includes additional interrelated fields 238 that define POP3 specific data. E-mail POP3 schema 237 can be utilized to extend an electronic mail message (e.g., including fields defined in accordance the e-mail protocol schema 233) to promote compatibility with the POP3 protocol. Interrelated fields 238 can define data formats as described in Table 12.

TABLE 12

| Field Name | Field Data Type | Field Description |
| --- | --- | --- |
| Deleted | Boolean | Defines a format for indicating if the message has been deleted on the server. |
| UIDL | String | Defines a format for representing how to synchronize the message. This field is used during synchronization when the feature to 'Leave messages on the server' is enabled. The UIDL is used to uniquely identify POP3 messages during synchronization. |

Depicted in FIG. 2C, e-mail NNTP message schema 239 derives from e-mail protocol schema 233 and includes additional interrelated fields 240 that define NNTP specific data.

E-mail NNTP schema 237 can be utilized to extend an electronic mail message (e.g., including fields defined in accordance the e-mail protocol schema 233) to promote compatibility with the NNTP protocol. Interrelated fields 240 can define data formats as described in Table 13.

TABLE 13

| Field Name | Field Data Type | Field Description |
| --- | --- | --- |
| ArticleID | Int32 | Defines a format for representing the article id of the message. The ArticleID used by the NNTP protocol to coordinate messages between the server and the client. |
| IsArticleExpired | Boolean | Defines a format for indicating if the message has been deleted from the server |
| IsKeepBody | Boolean | Defines a format for indicating if the message body is to be saved on cleanup. |
| Lines | Int64 | Defines a format for representing the number of lines in the message. |

Depicted in FIG. 2C, e-mail community news schema 241 further derives from e-mail NNTP schema 239 and includes additional interrelated fields 242 that define community news specific data. E-mail community news schema 241 can be utilized to extend an NNTP message (e.g., including fields defined in accordance the e-mail NNTP schema 239) to promote compatibility with community news messages. Interrelated fields 242 can define data formats as described in Table 14.

TABLE 14

| Field Name | Field Data Type | Field Description |
| --- | --- | --- |
| CommunityStatus | String | Defines a format for representing if a poster has found a post they are completely happy with. Possible values: 1) Not Included: No data available, 2) PosterApproved: The poster has read a post that adequately addresses this question, 3) Other Approved: Another category of poster has indicated that an answer adequately addresses this question |
| FeedBack | String | Defines a format for representing the type of feedback a user has submitted. Possible Values: 1) Not Included: No data submitted, 2) Answered: This indicates that this answer adequately addresses the question asked, 3) Helpful: This post was helpful, 4) NotHelpful: This post was not helpful. |
| PosterID | String | Defines a format for representing an identifier that uniquely identifies the poster. This field can be omitted if the post has not been authenticated. |
| PosterType | String | Defines a format for representing the type of newsgroup poster. Possible values: 1) Not Included: No type has been specified, 2) MVP: This poster is a MVP |
| PostType | String | Defines a format for representing the type of newsgroup post. Possible values: 1) Not Included: No type has been specified, 2) Question: This post is a question, 3) Suggestion: This post is a suggestion, 4) Comment: This post is a comment on a previous post, 5) Answer: This post is an answer to a previous question. |
| ThreadID | String | Defines a format for representing an identifier uniquely identifying a thread that includes the message. |

Message application extension schemas 250 includes a plurality of application extension schemas that can be utilized to extend a message item for compatibility with a plurality of corresponding message applications. For example, message application protocol extension schemas 250 include a blog application schema 251, e-mail application schema 253, second e-mail application schema 255, and fax application schema 257, that can promote compatibility with a blog application, a first electronic mail application, a second electronic mail application, and a fax application, respectively. The ellipses before, between, and after the schemas expressly depicted in message application extension schemas 250 indicate that message application extension schemas 250 can include additional schemas (e.g., for extending message items for compatibility with voice message applications, additional fax or email applications, news group applications, etc.).

Vertical ellipses 252, 256, and 258, indicate that the blog application schema 251, second e-mail application schema 255, and fax application schema 257, respectively, can contain one or more interrelated data fields. The one or more interrelated data fields can be utilized to extend a message item for compatibility with a corresponding message application. For example, e-mail application schema 253 includes interrelated fields 254 that can be utilized to extend a message item for compatibility with a particular electronic mail application. The particular electronic mail application can be different from a second e-mail application corresponding to second e-mail application schema 255. More specifically, interrelated fields 254 can define data formats as described in Table 15.

TABLE 15

| Field Name | Field Data Type | Field Description |
| --- | --- | --- |
| ForwardTo | String | Defines a format for representing if a message is to be auto forwarded. |
| HasPartialReceiveTime | Boolean | Defines a format indicating if time zone was included in the received time. |
| HighlightColor | String | Defines a format for representing a color used to highlight the message. Allows message to be color highlighted when they match a rule or filter. Possible values: None, Color1, Color2, . . . , or Color16. |
| IMAPUID | Int32 | Defines a format for representing a Unique identifier of the message on the IMAP server |
| IsIMAPDelayedDelete | Boolean | Defines a format for indicating if the message has been marked for IMAP delayed deletion. |
| IsMarkedForDownload | Boolean | Defines a format for indicating if the message has been marked for download. |

TABLE 15-continued

| Field Name | Field Data Type | Field Description |
|---|---|---|
| IsNewsGroupMessage | Boolean | Defines a format for indicating if the message is a news group message. |
| IsReceiptProcessed | Boolean | Defines a format for indicating if the receipt has already been processed.. |
| IsReceiptSent | Boolean | Defines a format for indicating if a receipt was sent. |
| IsSavedOffline | Boolean | Defines a format for indicating if the message was saved while in offline mode |
| RecHeader | String | Defines a format for representing the 'X-MSOESRec' header found in the message |
| PartialID | String | Defines a format for representing a partial ID for the message. If included, the value is the 'id' parameter in the Content-Type of a Message/Partial message |
| PartialNumber | Int32 | Defines a format for representing a partial number for the message. If included, the value is the 'number' parameter in the Content-Type of a Message/Partial message |
| PartialTotal | Int32 | Defines a format for representing a partial total for the message. If included, the value is the 'total' parameter in the Content-Type of a Message/Partial message. Possible Values: 0 or not included: The message is not a 'Message/Partial' Content-Type message. −1: The message is a full message and it was generated by successfully joining all parts in a 'Message/Partial' Content-Type message. 1 or more: The message is a 'Message/Partial' Content-Type message. |
| Refs | String | Defines a format for representing the Id of the thread that this message references. Can be used in NNTP and IMAP. |
| UserCodePageOverride | Int32 | Defines a format for representing a code page to convert the message to unicode. The code page value comes from the user choosing to try to decode the message with a different code page than was specified in the message |
| WasDeletedOffline | Boolean | Defines a format for indicating if the message was deleted while in offline mode |
| WatchStatus | String | Defines a format for representing whether the message wants to ignore, watch, or neither for a conversation thread. Possible values: None, Watch, or Ignore |
| XRef | String | Defines a format for representing a value of the XRef header |

Further detailed description of a fax application schema 257 is set forth with reference to FIG. 2F below. The fax application schema 257 includes interrelated fields 258 that can be utilized to extend a message item (e.g., defined in accordance with message schema 212) for compatibility with a particular fax application, such as a PC-based fax application or a fax console application.

Figure 2D:
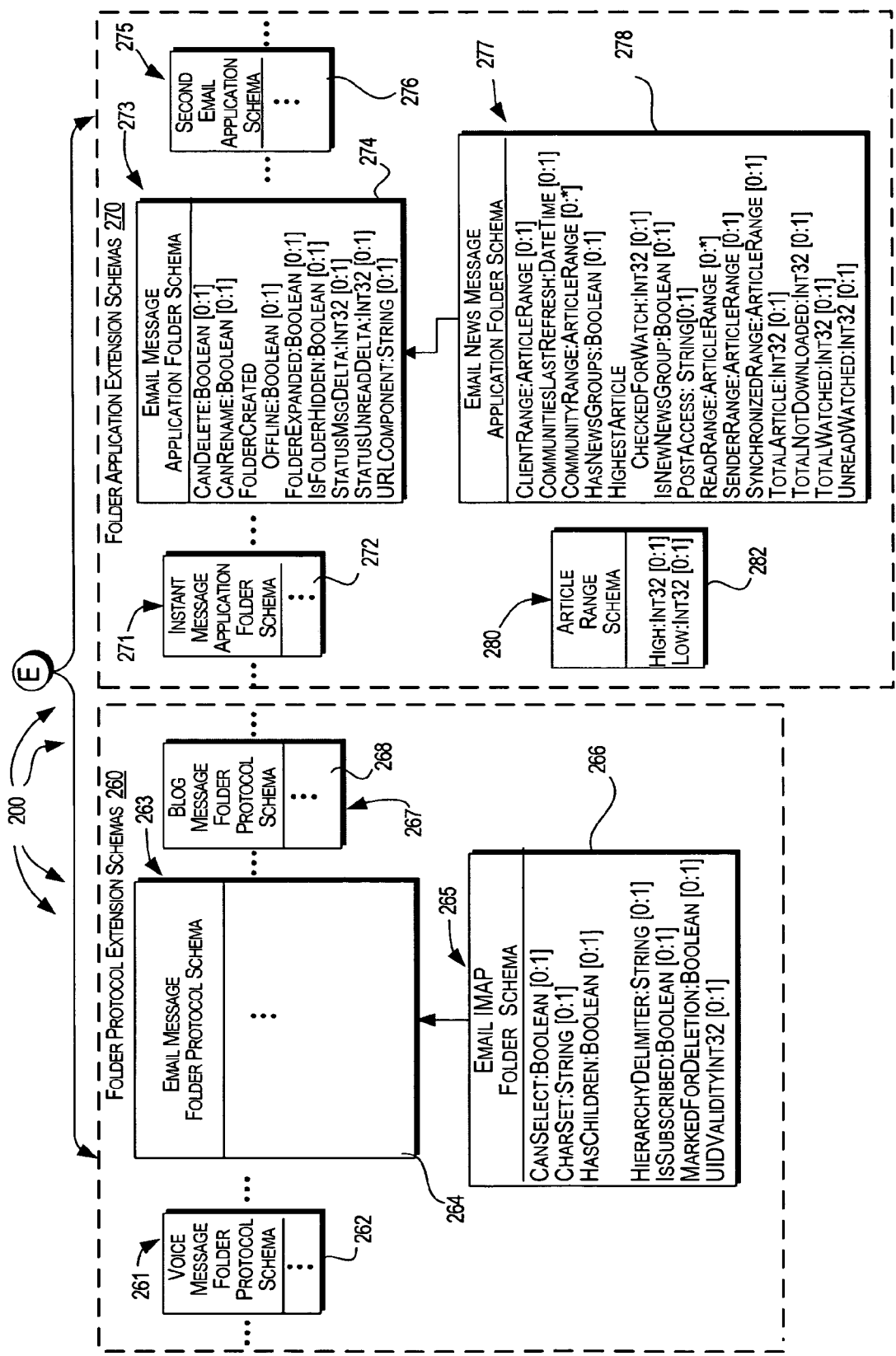
FIG. 2D illustrates a folder extension schema portion of an example of a more detailed schema hierarchy in accordance with the principles of the present invention.

Depicted in FIG. 2D, schema hierarchy 200 includes a plurality of folder extension schemas including folder protocol extension schemas 260 and folder application extension schemas 270. Folder protocol extension schemas 260 includes a plurality of folder protocol extension schemas that can be utilized to extend a folder item for compatibility with a plurality of corresponding folder protocols. For example, folder protocol extension schemas 260 includes voice message folder protocol schema 261, E-mail message folder protocol schema 263, and blog message folder protocol schema 267, that can promote compatibility with a voice message folder protocol, an electronic mail folder protocol, and a blog entry folder protocol respectively. The ellipses before, between, and after the schemas expressly depicted in folder protocol extension schemas 260 indicates that folder protocol extension schemas 260 can include additional schemas (e.g., for extending folder items for compatibility with instant message folder protocols, fax folder protocols, etc.).

Vertical ellipses 262, 264, 268 indicate that voice message folder protocol schema 261, e-mail message folder protocol schema 263, and blog entry folder protocol schema 267 respectively can contain one or more interrelated data fields. The one or more data interrelated data fields can be utilized to extend a folder item for compatibility with a corresponding folder protocol. Depicted in FIG. 2D, e-mail IMAP folder schema 265 further derives from e-mail message folder protocol schema 263 and includes additional interrelated fields 266 that define IMAP specific data. E-mail IMAP folder schema 265 can be utilized to extend an electronic mail message folder (e.g., including fields defined in accordance the e-mail message folder protocol schema 263) to promote compatibility with IMAP folders. Interrelated fields 266 can define data formats as described in Table 16.

TABLE 16

| Field Name | Field Data Type | Field Description |
|---|---|---|
| CanSelect | Boolean | Defines a format for indicating if the UI will allow this folder to be selected. |
| CharSet | String | Defines a format for representnig how to use a modified version of UTF-7 to |

TABLE 16-continued

| Field Name | Field Data Type | Field Description |
|---|---|---|
| | | transmit Unicode Folder names. If the folder name was received from the server and didn't conform to RFC 2060 Section 5.1.3's method of encoding in UTF-7, then the local user's charset will be recorded into this field. If the server didn't encode into UTF-7, they are likely to be a legacy client using windows Code Pages. If this value is set, the folder name received from the server was converted into BASE-64 encoding and then stored in unicode in the Mail.IMAPFolder.DisplayName. |
| HasChildren | Boolean | Defines a format for indicating if a plus sign should be shown in the UI because the folder has children. |
| HierarchyDelimiter | String | Defines a format for representing the folder path on IMAP server. This character can be stored in unicode, but when converted to ANSI using the US code page, it will not have the high bit set. |
| IsSubscribed | Boolean | Defines a format for indicating if the folder is subscribed to. This can be done for IMAP, NNTP, or folders that the transport may not subscribe to. |
| MarkedForDeletion | Boolean | Defines a format for indicating if the folder is marked for IMAP deletion and will be deleted on the server when all child folders are deleted. |
| UIDValidity | Int32 | Defines a format for representing a UIDVALIDITY value for the IMAP folder. Can be returned from the IMAP server in a 'UIDVALIDITY' response. |

Folder application extension schemas 270 include a plurality of application extension schemas that can be utilized to extend a folder item for compatibility with a plurality of corresponding folder applications. For example, folder application extension schemas 270 includes instant message folder application schema 271, e-mail message folder application schema 273, and second e-mail folder application schema 275, that can promote compatibility with an instant message folder application, a first electronic mail folder application, and a second electronic mail folder application respectively. The ellipses before, between, and after the schemas expressly depicted in folder application extension schemas 270 indicates that folder application extension schemas 270 can include additional schemas (e.g., for extending folder items for compatibility with blog entry folder applications, fax folder applications, etc.).

Vertical ellipses 272 and 276 indicate that instant message application folder schema 271 and second e-mail message application folder schema 275 respectively can contain one or more interrelated data fields. The one or more interrelated data fields can be utilized to extend a folder item for compatibility with a corresponding folder application. For example, e-mail message application folder schema 273 includes interrelated fields 274 that can be utilized to extend a folder item for compatibility with a particular electronic mail folder application. The particular electronic mail folder application can be different from a second electronic mail folder application corresponding to second e-mail message folder application schema 275. More specifically, interrelated fields 274 can define data formats as described in Table 17.

TABLE 17

| Field Name | Field Data Type | Field Description |
|---|---|---|
| CanDelete | Boolean | Defines a format for indicating if a folder can be deleted. May indicate if the folder is needed either by an e-mail application or a server. |
| CanRename | Boolean | Defines a format for indicating if the folder can be renamed. Some servers may suppress renaming folders. For example, IMAP can suppress renaming special folders such as "Drafts" and "sent Items". |
| FolderCreatedOffline | Boolean | Defines format for indicating if the folder was created offline and is to be created on server when transitioning back online. |
| FolderExpanded | Boolean | Defines a format for indicating if the folder is in an expanded state. |
| IsFolderHidden | Boolean | Defines a format for indicating if the folder is to be hidden from the Folder Tree in UI. Can be used by users to hide folders. |
| StatusMsgDelta | Int32 | Defines a format for representing the number of messages added via IMAP status response |
| StatusUnReadDelta | Int32 | Defines a format for representing the number of unread messages added via IMAP status response. |
| URLComponent | String | Defines a format for representing a URI/URL that can be used by the transport to map to the folder on the server. |

Depicted in FIG. 2D, e-mail news message folder application schema 277 derives from e-mail message folder application schema 273 and includes additional interrelated fields 278 that define news message specific data. E-mail news message application folder schema 277 can be utilized to extend an electronic mail message folder (e.g., including fields defined in accordance the e-mail message folder application schema 273) to promote compatibility with news message folder applications. Interrelated fields 278 can define data formats as described in Table 18.

TABLE 18

| Field Name | Field Data Type | Field Description |
|---|---|---|
| ClientRange | ArticleRange | Defines a format for representing the range of articles on the client |
| CommunitiesLastRefresh | DateTime | Defines a format for indicating the last date and time the community dynamic properties were refreshed. |
| CommunityRange | ArticleRange | Defines a format for representing a collection of ArticleID ranges that have been synchronized with Community header properties. |

TABLE 18-continued

| Field Name | Field Data Type | Field Description |
|---|---|---|
| HighestArticleCheckedForWatch | Int32 | Defines a format for representing the highest numbered article that has been checked for watch information. |
| IsNewNewsGroup | Boolean | Defines a format for indicating if the folder is a new news group. |
| PostAccess | String | Defines a format for representing how news group posts are allowed. Some news groups may limit if or how posts are allowed. Possible Values: 1) Not Incuded: No access limitations are imposed. 2) NoPosting: Posts are not allowed to be made to this server. 3) Moderated: Posts to this server will be moderated. 4) Blocked: Posts to this server will be blocked. |
| ReadRange | ArticleRange | Defines a format for representing a collection of ArticleID ranges that have been read. |
| SynchronizedRange | ArticleRange | Defines a format for representing a collection of ArticleID ranges that have been synchronized for this folder. |
| TotalArticle | Int32 | Defines a format for representing the count of articles on the newsgroup server. |
| TotalNotDownloaded | Int32 | Defines a format for representing the number of newsgroup messages that have not yet been downloaded. |
| TotalWatched | Int32 | Defines a format for representing the number of watched messages. |
| UnreadWatched | Int32 | Defines a format for representing the number of watched messages that are unread. |

Depicted in FIG. 2D, article range schema 281 includes interrelated fields 282 that define a format for representing an article range. Interrelated fields 282 can define data formats as described in Table 19.

TABLE 19

| Field Name | Field Data Type | Field Description |
|---|---|---|
| High | Int32 | Defines a format for representing a High ArticleID value in the range that was synchronized. |
| Low | Int32 | Defines format for represeing a Low ArticleID value in the range that was synchronized. |

Figure 2E:
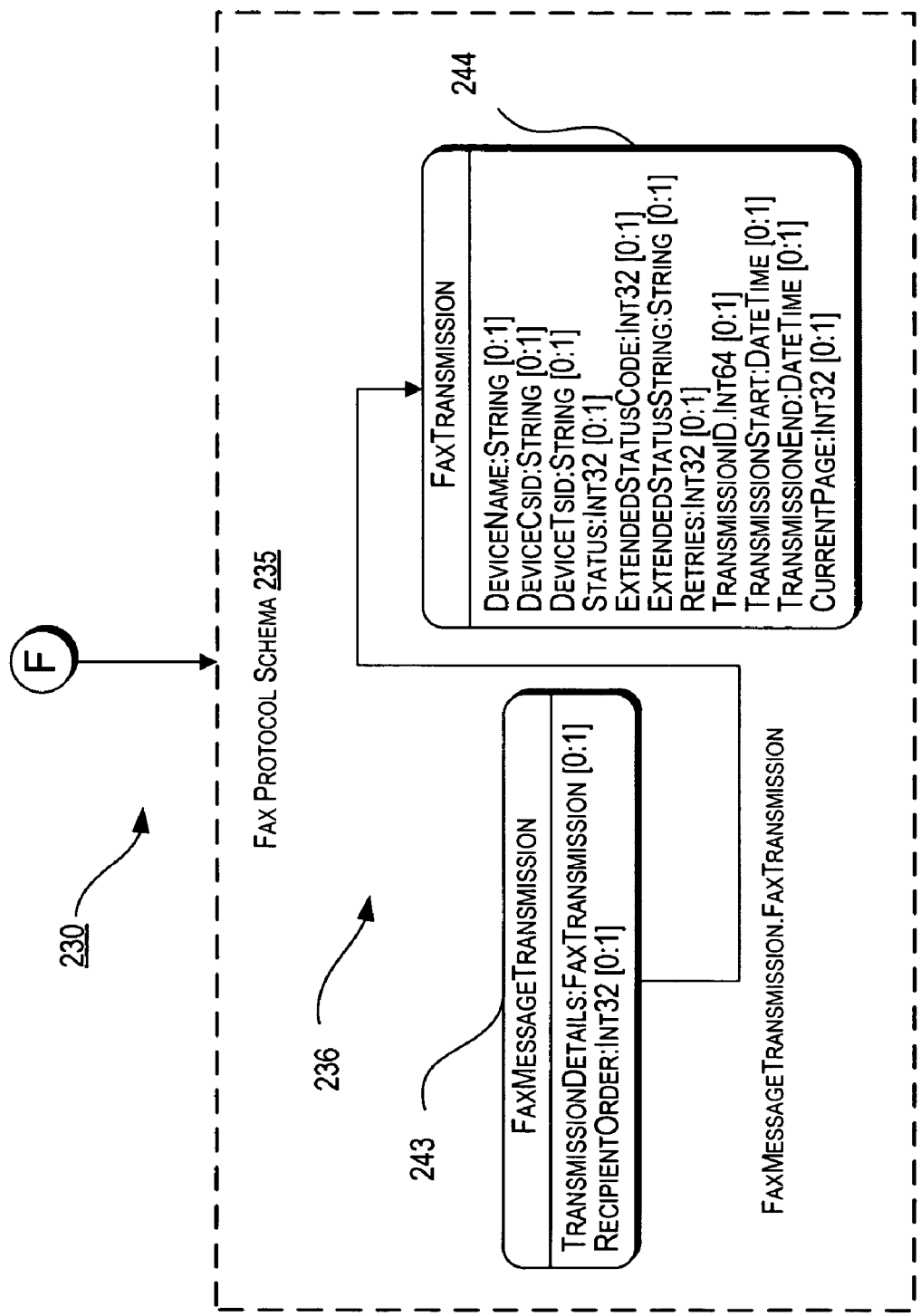
FIG. 2E illustrates a fax protocol schema portion of the message protocol extension illustrated in FIG. 2C in an example of a fax schema formed in accordance with the principles of the present invention.

Depicted in FIG. 2E is the fax protocol schema 235 previously described with reference to FIG. 2C. As depicted, the fax protocol schema 235 includes a hierarchy of interrelated fields 236 that can be utilized to extend a message item (e.g., defined in accordance with message schema 212) for compatibility with a particular fax transmission protocol. More specifically, the hierarchy of interrelated fields 236 includes fields defined in a fax message transmission schema 243 and a fax transmission schema 244. A broadcast fax message sent to "n" recipients will result in "n" fax transmissions. The fax message transmission and fax transmission schemas contain the details of the transmissions that are of interest. In particular, the fax message transmission schema 243 is used to represent each participant of the fax message (i.e., the sender and each recipient) as described in Table 20. In one embodiment, the fax message transmission schema 243 may be derived from relationships that link the message item to a message application extension, such as the fax message extension schema 258 of fax application schema 257 described below with reference to FIG. 2F. In another embodiment, the fax message transmission schema 243 may be derived from the MessageParticipants data field in the message item as defined in accordance with message schema 212.

The details of each fax transmission may differ for each participant. Accordingly, the fax message transmission schema 243 contains a data field to refer or link to a fax transmission schema 244, as described in Table 21. The fax transmission schema 244 represents the details of the fax transmission for each recipient identified in the fax message transmission schema 243. More specifically, interrelated fields 236 of the fax message transmission 243 and fax transmission 244 schemas can define data formats as described in Tables 20 and 21, respectively.

TABLE 20

| Field Name | Field Data Type | Field Description |
|---|---|---|
| TransmissionDetails | FaxTransmission | Defines a format for representing a link to a fax transmission item (see Table 21) that points to the recipient of this fax transmission. There is one fax transmission for every recipient - this field may be null for a sender. The fax transmission item contains the details about the fax transmission that took place for this recipient. |
| RecipientOrder | Int32 | Defines a format for an indication of the order of this recipient among all of the recipients of the fax message associated with this fax transmission |

TABLE 21

| Field Name | Field Data Type | Field Description |
| --- | --- | --- |
| DeviceName | String | Defines a format for representing the name of the device used for processing this transmission. |
| DeviceCsid | String | Defines a format for representing the Called Station Identifier of the device. Nullable as devices can have null CSIDs. |
| DeviceTsid | String | Defines a format for representing the Transmitting Station Identifier of the device. Nullable as devices can have null TSIDs. |
| Status | Int32 | Defines a format for representing the current status of the fax transmission. |
| ExtendedStatusCode | Int32 | Defines a format for representing the extended status code describing the extended status for this transmission. Nullable because not all jobs have this extended status. |
| ExtendedStatusString | String | Defines a format for representing the string that describes extended status for this transmission. Nullable because not all jobs may have this extended status. |
| Retries | Int32 | Defines a format for representing the number of retries made for this transmission. For outgoing faxes, the number of retries may be the number of times the fax service attempted to call the destination number. For incoming faxes, the number of retries may be the number of attempts the fax service made to route the fax according to a set of configured inbound routing rules. The rules can, for example, print the received fax on a printer, store the fax in a folder, or sent it via an email to a pre-configured email address. |
| TransmissionID | Int64 | Defines a format for representing the unique id of the transmission with which the fax service identifies this particular transmission. This ID is unique for all transmissions on a particular fax server. |
| TransmissionStart | DateTime | Defines a format for representing the time when transmission is started. If a transmission is retried, "Start" and "End" times for the previous attempts are not stored. |
| TransmissionEnd | DateTime | Defines a format for representing the time when transmission is completed. If a transmission is retried, "Start" and "End" times for the previous attempts are not stored. |
| CurrentPage | Int32 | Defines a format for representing the number of the page in the fax transmission that the fax service is currently processing. |

In addition to the fax message transmission 243 and fax transmission 244 schemas as described in Tables 20 and 21, some of the differences in the details of each fax transmission are reflected in the actual content of the fax transmission. For each recipient of a broadcast fax message the content may differ because the cover page rendering reflects differences in each recipient's contact information. In addition, the content may differ because the body of each fax transmission contains a fax banner (the small text that appears at the top of each page of a fax transmission) that reflects the time of the transmission to that particular recipient. Therefore, details about the content of the fax transmission may be defined in accordance with a content schema, such as content schema 216, as previously described with reference to FIG. 2A in Table 5. The content schema 216 for defining a fax transmission may be derived from the message contents relationship as defined in the message schema 212 for the message item to which the fax transmission schema 244 is linked.

Figure 2F:
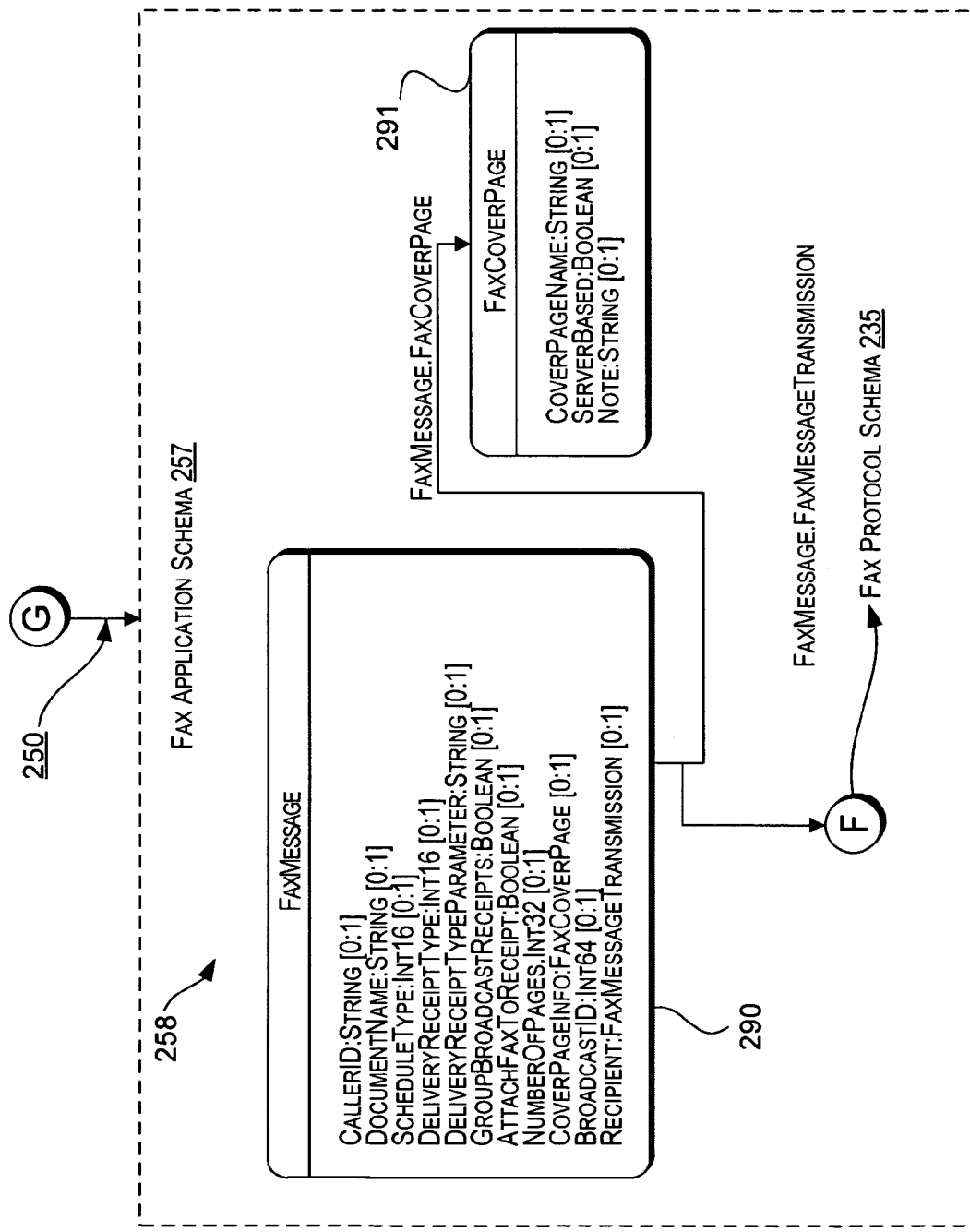
FIG. 2F illustrates a fax application schema portion of the message application extension illustrated in FIG. 2C in an example of a fax schema formed in accordance with the principles of the present invention.

Depicted in FIG. 2F is the fax application schema 257 previously described with reference to FIG. 2C. As depicted, the fax application schema 257 includes a hierarchy of interrelated fields 258 that can be utilized to extend a message item (e.g., a message defined in accordance with message schema 212) for compatibility with a fax application, such as a PC-based fax application. More specifically, the hierarchy of interrelated fields 258 includes fields defined in a fax message schema 290 and a fax cover page schema 291. As noted previously, a broadcast fax message sent to "n" recipients will result in "n" fax transmissions. The fax message schema 290, as described in Table 22, contains the fax-specific details of the message that was transmitted, and the fax cover page schema 291, as described in Table 23, contains further fax-specific details about the cover page used for this fax message. The cover page details contained in the fax cover page schema 291 are per message, and, unlike the rendered cover page details described above with reference to the fax protocol schema 235 and content schema 216, do not vary for each recipient. More specifically, interrelated fields 258 of the fax message 290 and cover page 291 schemas may define data formats as described in Tables 22 and 23, respectively.

TABLE 22

| Field Name | Field Data Type | Field Description |
| --- | --- | --- |
| CallerID | String | Defines a format for representing the identification of the calling device that sent the received fax document. In one embodiment the CallerID includes the telephone number of the calling device. Not applicable for outgoing messages. |
| DocumentName | String | Defines a format for a null-terminated string that contains the user-friendly name to display for the fax document. |
| ScheduleType | Int16 | Defines a format for representing the type of delivery schedule used for this transmission. Enumeration values may be 0 - now, 1 - at specific time, and 2 - when discount rates apply. When delivering at a specific time, the time is contained in the DeferredSendTime field of core message type. This field applies only to outgoing faxes, and is null for incoming faxes. |
| DeliveryReceiptType | Int16 | Defines a format for representing the type of delivery receipt used for this transmission. Enumeration values may be 0 - no receipt, 1 - email, 2 - IM. This field may be interpreted when a delivery receipt is requested as per the DeliveryReceiptRequested data field. This field applies to outgoing faxes, and may be null for incoming faxes. Note: the DeliveryReceiptRequested data field may be contained in the core message type. |
| DeliveryReceiptTypeParameter | String | Defines a format for representing delivery receipt parameters. When a type of delivery receipt other than "No receipt" is selected, this data field contains a string parameter for the selected delivery receipt type. For example, this data field contains an email address when the DeliveryReceiptType is 'Email' or 'IM'. This email address is then used to deliver the fax transmission. |
| GroupBroadcastReceipts | Boolean | Defines a format for representing a flag that indicates whether the fax service sends a receipt for each fax recipient of a fax broadcast, or one receipt that contains a summary for all recipients. If TRUE, one summary receipt will be sent for a broadcast fax. |
| AttachFaxToReceipt | Boolean | Defines a format for representing a flag indicating whether to attach a fax to the receipt. A value of TRUE indicates that a fax will be attached to the receipt. A value of FALSE indicates that a fax will not be attached to the receipt. By default, AttachFaxToReceipt is set to FALSE. |
| NumberOfPages | Int32 | Defines a format for representing the number of pages in the fax message including the cover page. |
| CoverPageInfo | FaxCoverPage | Defines a format for representing a link to a FaxCoverPage database item (see Table 23) defined by a fax cover page schema. The FaxCoverPage database item contains information about the specific cover page that is used for this fax message. This property is applicable only for outgoing fax messages |
| BroadcastID | Int64 | Defines a format for representing a unique ID with which a fax service identifies a given fax message on a particular fax server. Among other uses, this unique Broadcast ID may be used to show a multi-recipient fax as one entry in an electronic mail client. |

TABLE 22-continued

| Field Name | Field Data Type | Field Description |
|---|---|---|
| Recipient | FaxMessageTransmission | Defines a format for representing a link to a fax message transmission database item (see Table 20) that points to a recipient of the fax message. There is one fax message item for a broadcast fax message and one fax transmission item for each recipient - this field may be null for a sender. The fax message transmission database item describes the relationship between the fax message item and the fax transmission item for that recipient. |

TABLE 23

| Field Name | Field Data Type | Field Description |
|---|---|---|
| CoverPageName | String | Defines a format for representing the name of the cover page used. The name is a relative file name when the cover page is server-based as indicated by the ServerBased flag described below, and a full pathname to the cover page file when the cover page is generated on the client. |
| ServerBased | Boolean | Defines a format for representing a flag indicating if the cover page is server-based. A TRUE value indicates server-based, and a FALSE value indicates not server-based. |
| Note | String | Defines a format for representing the value of the "Note" field in the cover page. |

Figure 3:
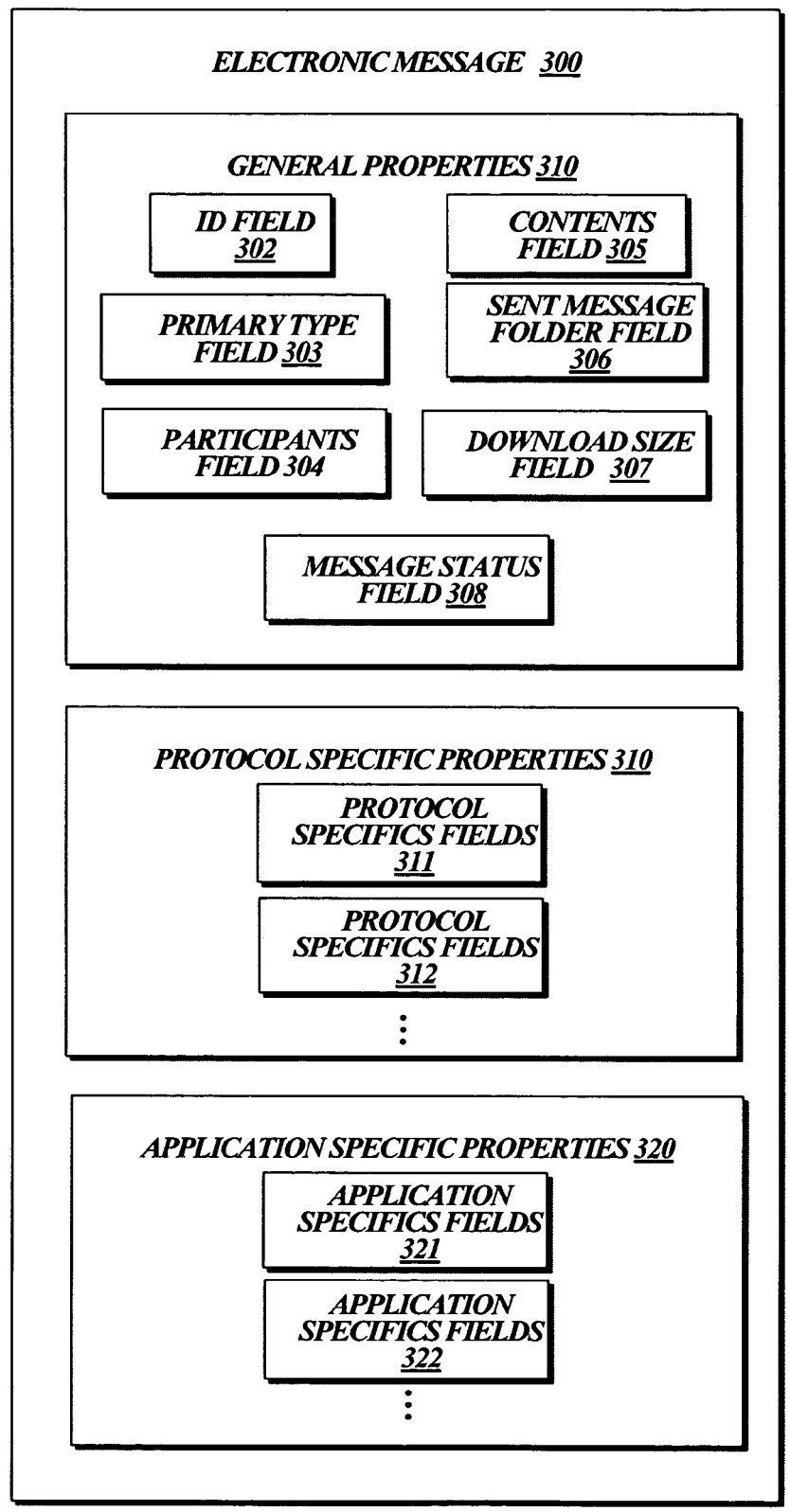
FIG. 3 illustrates an example electronic message formatted in accordance with the principles of the present invention.
Figure 8:
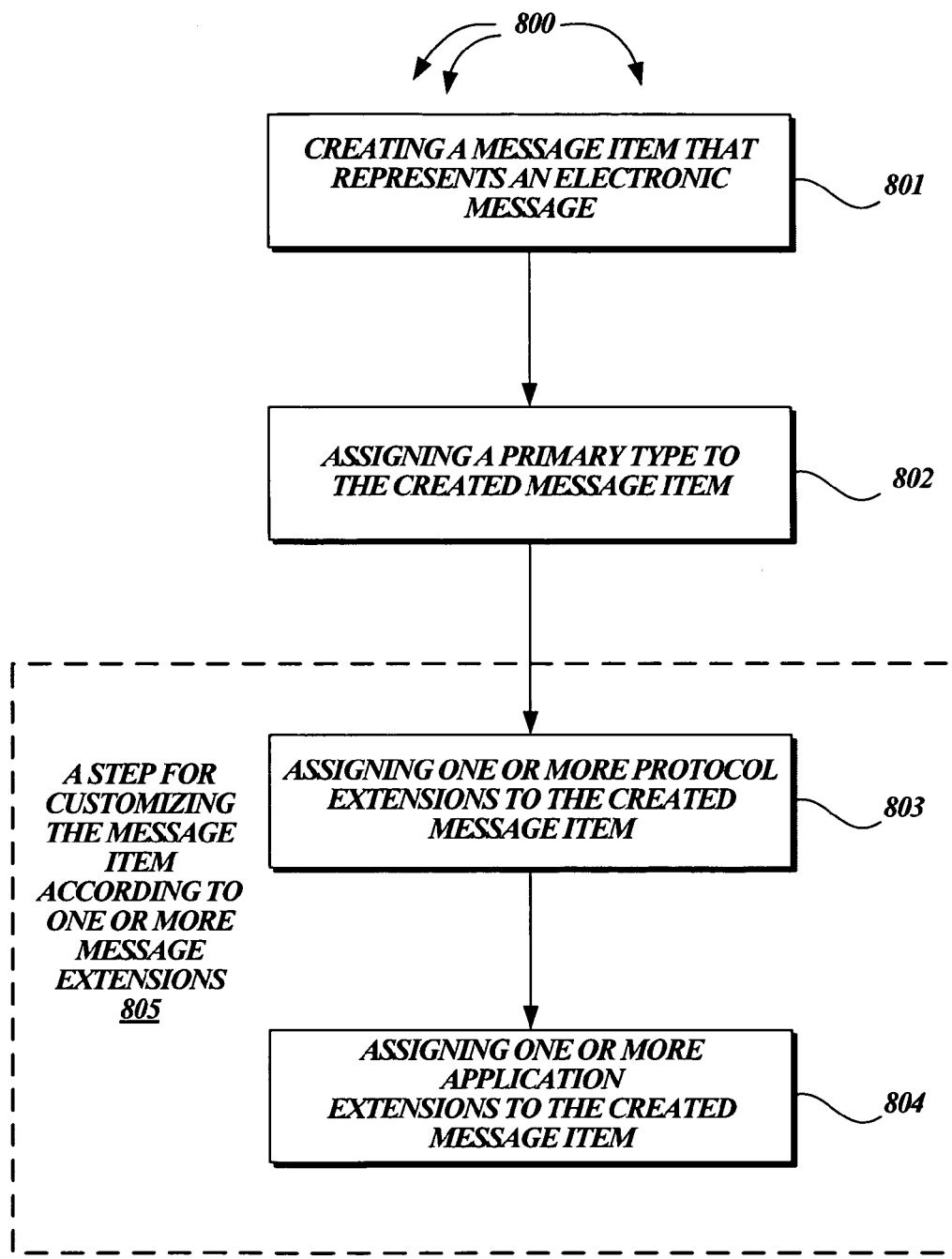
FIG. 8 illustrates an example flowchart of a method for creating an electronic message in accordance with the principles of the present invention.

Schemas included in a schema hierarchy, such as, for example, schema hierarchy 150 or schema hierarchy 200, can be utilized to create database items that are stored in database 114. For example, base item schema 151, message schema 152 and potentially one or message protocol extension schemas from message protocol extension schemas 161 and/or one or more message application schemas from message application extension schemas 166 can be utilized to create an electronic message. FIG. 3 illustrates an example electronic message 300 formatted in accordance with the principles of the present invention. FIG. 8 illustrates an example flowchart of a method 800 for creating an electronic message in accordance with the principles of the present invention. The method 800 will be described with respect to network architecture 100, schema hierarchy 150, and electronic message 300. Any of the messages depicted in network architecture 100 (i.e., message items 107, 108, 112, and 116) can be similar in format to electronic message 300.

The method 800 includes an act of creating a message item that represents an electronic message (act 801). Act 801 can include a computer system creating a message item that represents an electronic message. For example, computer system 102 or computer system 109 can create a message item that represents an electronic message (e.g., electronic message item 108 or 112). It may be that a message item is created in response to user-input, such as, for example, selecting a "New Message" option for a user-interface. User-input can be received locally, for example, from a local input device, such as a keyboard or mouse, or can be received from a remote location, for example, from some other network connectable computer system.

Creating a message item can include creating a data structure that includes one or more fields defined in accordance base item schema 151 and message schema 152. Fields defined in accordance with base item schema 151 and message schema 152 can represent general properties that are common to a plurality of different types of electronic messages. General properties 301 are an example of message property fields that may be common to a plurality of different types of electronic messages. An identifier, such as, for example, a globally unique identifier ("GUID"), can be assigned to ID field 302. The assigned identifier can distinguish the message item representing electronic message 300 from other items in database 114.

The method 800 includes an act of assigning a primary type to the created message item (act 802). Act 802 can include a computer system assigning a primary type to the created message item. The primary message type can indicate a general behavior of electronic message 300, such as, for example, as an electronic mail message, a fax message, a news group posting. etc. Assigning a primary message type to electronic message 300 can include assigned a primary message type value representing, for example, an electronic mail message, an instant message, a fax message, a news group posting, or blog entry, to primary type field 303. Accordingly, primary type field 303 can represent a primary message type of the electronic message identified by the identifier in ID field 302.

Other properties of electronic message 300 can also be assigned. Participants field 304 can be assigned one or more message participant relationships representing links to one or more participants associated with electronic message 300 (the electronic message identified by the identifier in ID field 302). Contents field 305 can be assigned one or more message content relationships representing links to one or more portions of message content corresponding to message 300. Sent message field 306 can be assigned one or more folder relationships representing links to one or more message folders that electronic message 300 is to be moved to after being submitted for delivery. Download State field 307 can be assigned a download state (e.g., partial, etc) corresponding to electronic message 300.

Message status field 308 can be assigned one or more values representing the status of message 300. For example, message status field 308 can be assigned an IsRead indication indicating if message 300 has been read, a SendStatus indication indicating the send status of message 300, a LastActionTaken indication indicating the last action taken on electronic message 300, a LastActionTime representing the time the last action was taken on electronic message 200, and a LastActionType field representing the type of the last action taken on electronic message 300. The fields of general properties 301 can correspond to data formats described above in Table 2.

The method 800 includes a functional result-oriented step for customizing the message item according to one or more message extensions (step 805). Step 805 can include any corresponding acts that result in customizing the message item according to one or more message extensions. However, in the illustrative example FIG. 8, the step 805 includes a corresponding act of assigning one or more protocol extensions to the created message item (act 803).

Act 803 can include a computer system assigning one or more protocol extensions to the created message item. Assigning a protocol extension can include adding (or snapping on) fields, which are defined in accordance with a message protocol extension schema, to the message item. Message protocol extensions can include electronic mail protocol extensions (e.g., a POP3 extension), instant messaging protocol extensions, fax protocol extensions, news group posting protocol extensions (e.g., an NNTP or community news extension), blog entry protocol extensions, etc. that define formats for representing protocol specific properties.

Generally, protocol specific properties, such as, for example, protocol specific properties 310, represent properties that are specific to one or more message protocols. Fields can be added to or removed from protocol specific properties 310 based on compatibility requirements of electronic message 300. For example, protocol specific fields 311 (e.g., defined in accordance protocol extension schema 163) and protocol specific fields 312 (e.g., defined in accordance protocol extension schema 162) can be added to promote compatibility with corresponding message protocols. The vertical ellipsis in protocol specific properties 310 represents that other protocol specific fields can also be included protocol specific properties 310.

In the illustrative example FIG. 8, the step 805 includes a corresponding act of assigning one or more application extensions to the created message item (act 804). Act 804 can include a computer system assigning one or more application extensions to the created message item. Assigning an application extension can include adding (or snapping on) fields, which are defined in accordance with a message application extension schema, to the message item. Message application extensions can include electronic mail application extensions (e.g., for compatibility with Microsoft® Outlook® Express, Microsoft® Outlook®, Eudora, Novell GroupWise®, etc.), instant messaging application extensions, fax application extensions, news group posting application extensions, blog entry application extensions, etc. that define formats for representing application specific properties.

Generally, application specific properties, such as, for example, application specific properties, 320 represent properties that are specific to one or more message applications. Fields can be added to or removed from application specific properties 320 based on compatibility requirements of electronic message 300. For example, application specific fields 321 (e.g., defined in accordance protocol extension schema 167) and application specific fields 322 (e.g., defined in accordance protocol extension schema 168) can be added to promote compatibility with corresponding message applications The vertical ellipsis in application specific properties 320 represents that other application specific fields can also be included protocol specific properties 320.

Figure 4:
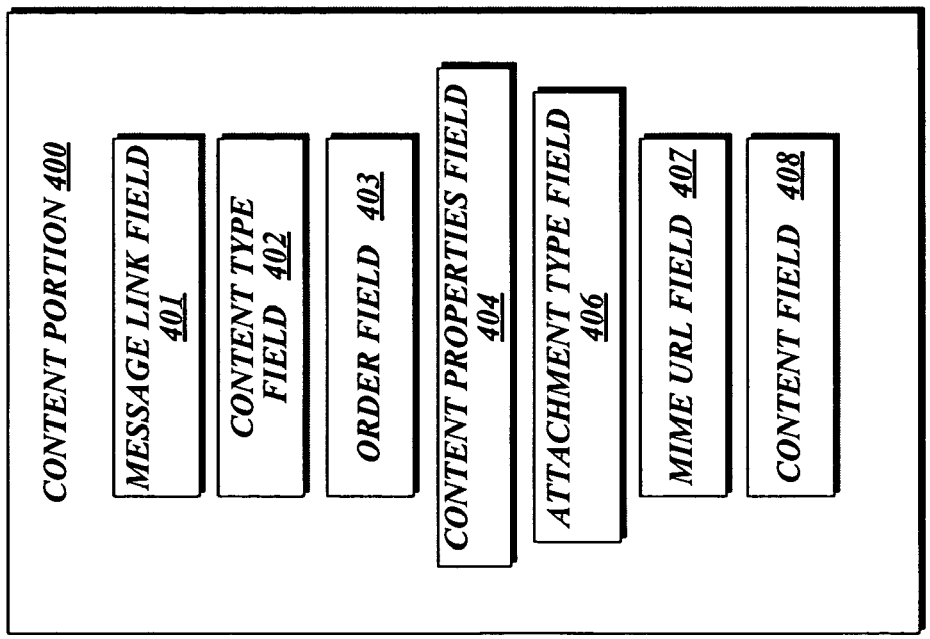
FIG. 4 illustrates an example content portion formatted in accordance with the principles of the present invention.

Other database items can also be created in accordance with schemas in schema hierarchy 150 or schema hierarchy 200. FIG. 4 illustrates an example content portion 400 formatted in accordance with the principles of the present invention. Content portion 400 can include fields formatted in accordance with a content schema (e.g., content schema 156). Message link field 401 can be assigned a message relationship representing a link from content portion 400 to an electronic message. Content type field 402 can represent a content type corresponding content portion 400. Order field 403 can represent an order corresponding to content portion 400. Content field 408 can represent message data (e.g., text of an electric mail message, the body of a fax message, or the image of the cover page for a particular recipient of the fax message) corresponding to content portion 400.

When content portion 400 is an attachment, content portion 400 can optionally include attachment type field 406 and MIME URL field 407. Attachment type field 405 represent the attachment type of content portion 400. MIME URL field 407 represents a link to a MIME path that corresponds to content portion 400.

Figure 5:
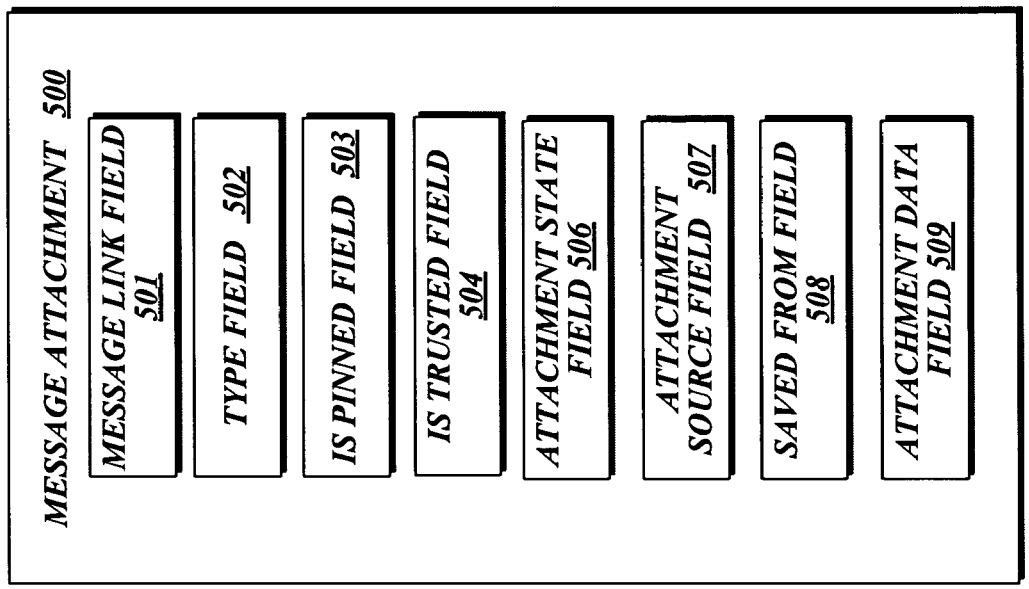
FIG. 5 illustrates an example attachment formatted in accordance with the principles of the present invention.

FIG. 5 illustrates an example message attachment 500 formatted in accordance with the principles of the present invention. Message attachment 500 can include fields defined in accordance with an attachment schema (e.g., attachment schema 157). Message link field 501 can be assigned a message relationship representing a link from message attachment 500 to an electronic message. Type field 502 represents a message type of the electronic message linked to by the link in link field 501. IsPinned field 503 represents the deletion status of message attachment 500 with respected to the electronic message linked to in link to by the link in link field 501. IsTrusted field 504 represents trust information related to message attachment 500.

Attachment state field 506 represents the type and behavior of message attachment 500. Attachment source field 507 can be assigned a relationship representing a link to a database item where the message attachment 500 was accessed. SaveFromField 508 can be assigned a relationship representing a link to message attachment 500. Attachment data field 509 can represent attachment data (e.g, the contents of an MP3) corresponding to message attachment 500.

Figure 6:
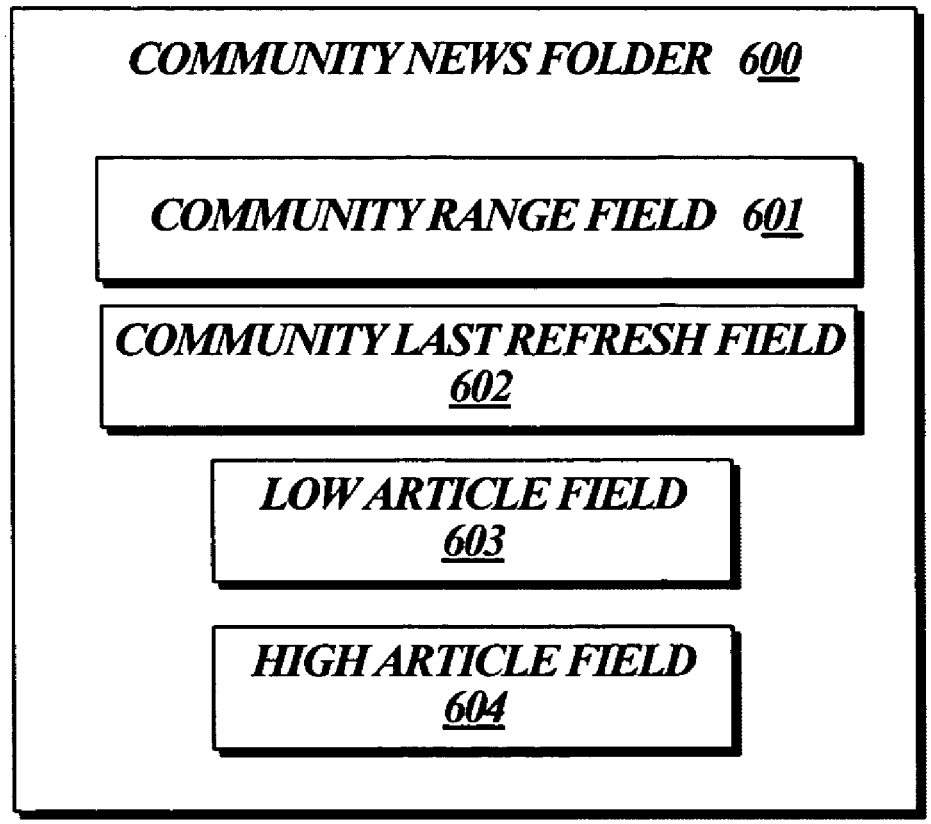
FIG. 6 illustrates an example community news folder formatted in accordance with the principles of the present invention.

FIG. 6 illustrates an example community news folder 600 formatted in accordance with the principles of the present invention. Community news folder 600 can include fields defined in accordance with a folder schema (e.g., folder schema 154) and potentially one or more folder extension schemas (e.g., e-mail news message application folder schema 277). Community range field 601 represents a collection of article IDs from a news group community that have been synchronized with community header properties. Communities last refresh field 602 represents the last time the community dynamic properties of the news group community including the collection of synchronized article IDs represented in community range field 601 was refreshed. Low article ID field 603 represents a low article ID included in the collection of synchronized article IDs represented in community range field 601. High article ID field 604 represents a high article ID included in the collection of synchronized article IDs represented in community range field 601.

Figure 9:
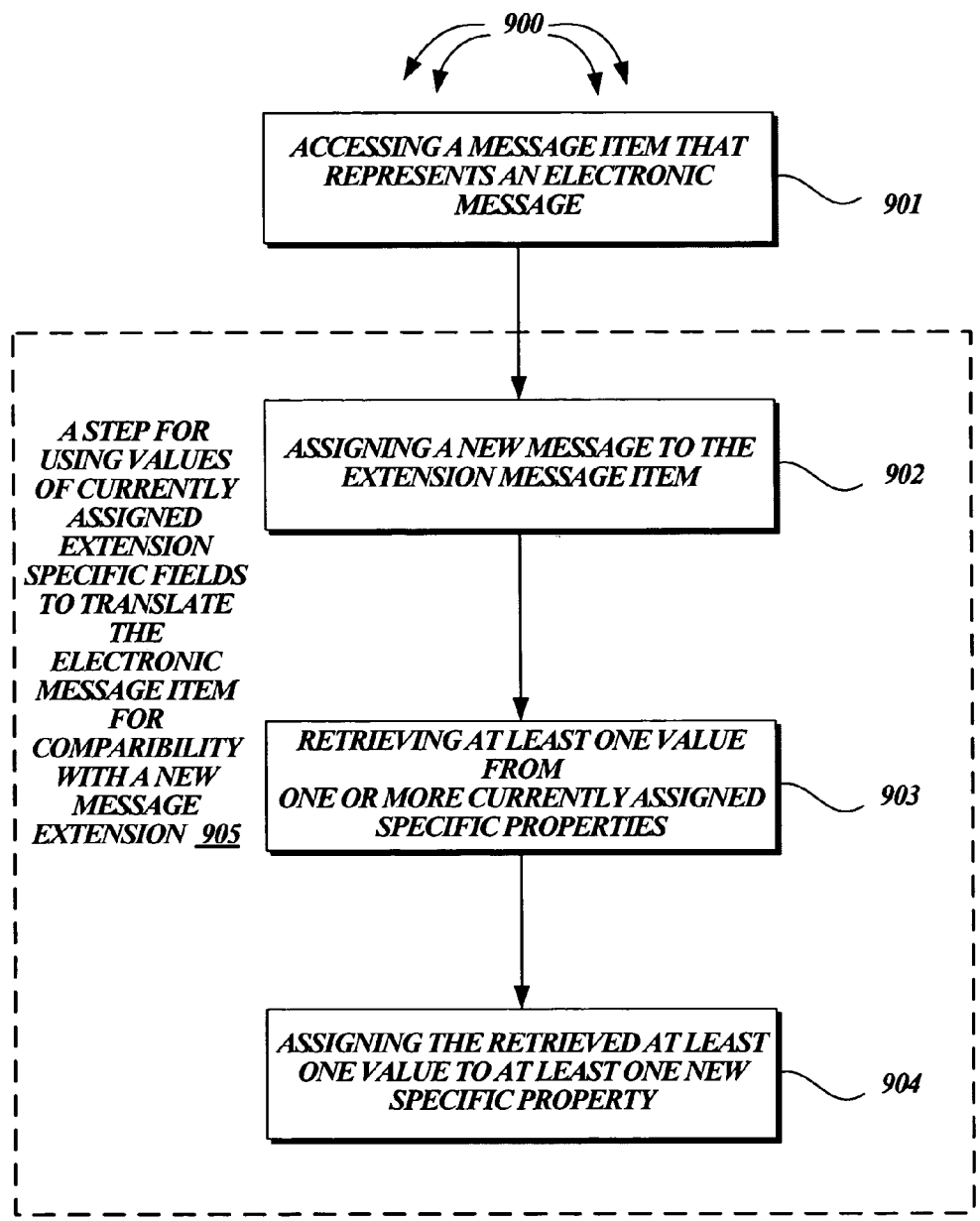
FIG. 9 illustrates an example flowchart of a method for transforming an electronic message for compatibility with a message extension in accordance with the principles of the present invention.

In some embodiments, values in fields defined in accordance with one message extension schema are retrieved and utilized to populate fields defined in accordance with another message extension schema. Thus, an electronic message can be efficiently transform for compatibility with a protocol or application corresponding to the other extension schema. FIG. 9 illustrates an example flowchart of a method 900 for transforming an electronic message for compatibility with a message extension in accordance with the principles of the present invention. The method 900 will be described with respect to network architecture 100 and schema hierarchy 150.

The method 900 includes an act of accessing a message item that represents an electronic message (act 901). Act 901 can include a computer system accessing a message item that represents an electronic message. For example, computer system 102 can access message item 107. Similarly, computer system 109 can access message 116 or message item 108.

The method 900 includes a functional result-oriented step for using values of currently assigned extension specific fields to translate the electronic message item for compatibility with a new message extension (step 905). Step 905 can include any corresponding acts that result in using values of currently assigned extension specific fields to translate the electronic message item for compatibility with a new message extension. However, in the illustrative example of FIG. 9, step 905 includes a corresponding act of assigning a new message extension to the message item (act 902).

Act 902 can include a computer system assigning a new message extension to the message item. For example, computer system 102 can assign a new message extension to message item 107. Similarly, computer system 109 can assign a new message extension message item 108 or message item 116. A newly assigned message extension can include one ore more data fields defined in accordance with a message protocol extension schema or message application extension schema. For example, computer system 109 may assign a new message extension (an instant message application extension) to message item 107 (currently assigned an electronic mail application extension) to promote compatibility with message application 103 (an instant messaging application). It may be that electronic mail messages and instant messages have one or more similar fields. However, the one or more similar fields may not be similar to fields of a variety of other types of electronic messages, such as, for example, voice messages and fax messages. Accordingly, the one or more similar fields may not be included in a general message schema (e.g., message schema 152).

The computer system can send the message item in accordance with both the currently assigned message extension and the new message extension. Accordingly, a single message item can be sent to a number of applications without having to duplicate the content of the message item. Sending a single message item increases the likelihood of different applications, for example, an electronic mail application and a fax application, receiving consistent data.

In the illustrative example of FIG. 9, the step 905 includes a corresponding act of retrieving at least one value from one or more currently assigned specific properties (act 903). Act 903 can include a computer system retrieving at least one value from one or more currently assigned specific properties. For example, computer system 102 can retrieve at least one value retrieving at least one value from one or more currently assigned specific properties of message item 107 or 108. Similarly, computer system 109 can retrieve at least one value retrieving at least one value from one or more currently assigned specific properties of message item 112 or 116.

It may be that message application 111 is an application configured to transform messages for compatibility with other messaging applications. Messaging application 111 can retrieve message item 116 that, for example, is currently assigned a fax application extension. Messaging application 111 can analyze the currently assigned properties of the fax application extension to determine if any of the currently assigned properties (i.e., fax properties) are similar to any new properties (e.g., corresponding to an electronic mail application extension). For example, it may be that the fax application and the electronic mail application indicate if a message is saved offline in a similar manner. Thus, the saved offline value corresponding to the fax application may also be relevant to the electronic mail application. Accordingly, this saved offline value can be retrieved from the fax application extension.

In the illustrative example of FIG. 9, the step 905 optionally includes a corresponding act of assigning the retrieved at least one value to at least one new specific property (act 904). Act 904 can include a computer system assigning the retrieved at least one value to at least one new specific property. For example, computer system 102 can assign the retrieved at least one value to at least one new specific property of message item 107 or 108. Similarly, computer system 109 can assign the retrieved at least one value to at least one new specific property of message item 112 or 116.

For example, message application 111 can assign a retrieved value for a fax application property as a value for a similar electronic mail application property. Accordingly, the assigned values can promote compatibility with the electronic mail application. Message application 111 can stored the transformed message (e.g., as message item 112) in database 114. Alternately, message application can send the transformed message (e.g., as message item 107) to computer system 102. A corresponding electronic mail application, such as, for example, message application 103, can then compatibly access message item 107.

In some embodiments, a client computer system can send an electronic message to a server computer system for translation. For example, message item 108 can be composed at massage application 108. Subsequently, message application 104 may request message item 108. Accordingly, computer system 102 can submit message item 108 to computer system 109 for translation. Computer system 109 can transform the message for compatibility with message application 104 (e.g., by populating fields of a corresponding application extension). A transformed message, for example, message item 107, can be returned to computer system 102. Message application 104 can then access message item 107.

Transforming a message item can include referring to information in other silos of database 114. For example, when transforming a message, which is currently assigned an electronic mail application extension, for compatibility with a fax application extension, a message application may refer to information in a contacts silo 182. The message application can, for example, locate a telephone number that corresponds to a participant having an electronic mail address contained in the message.

Figure 10:
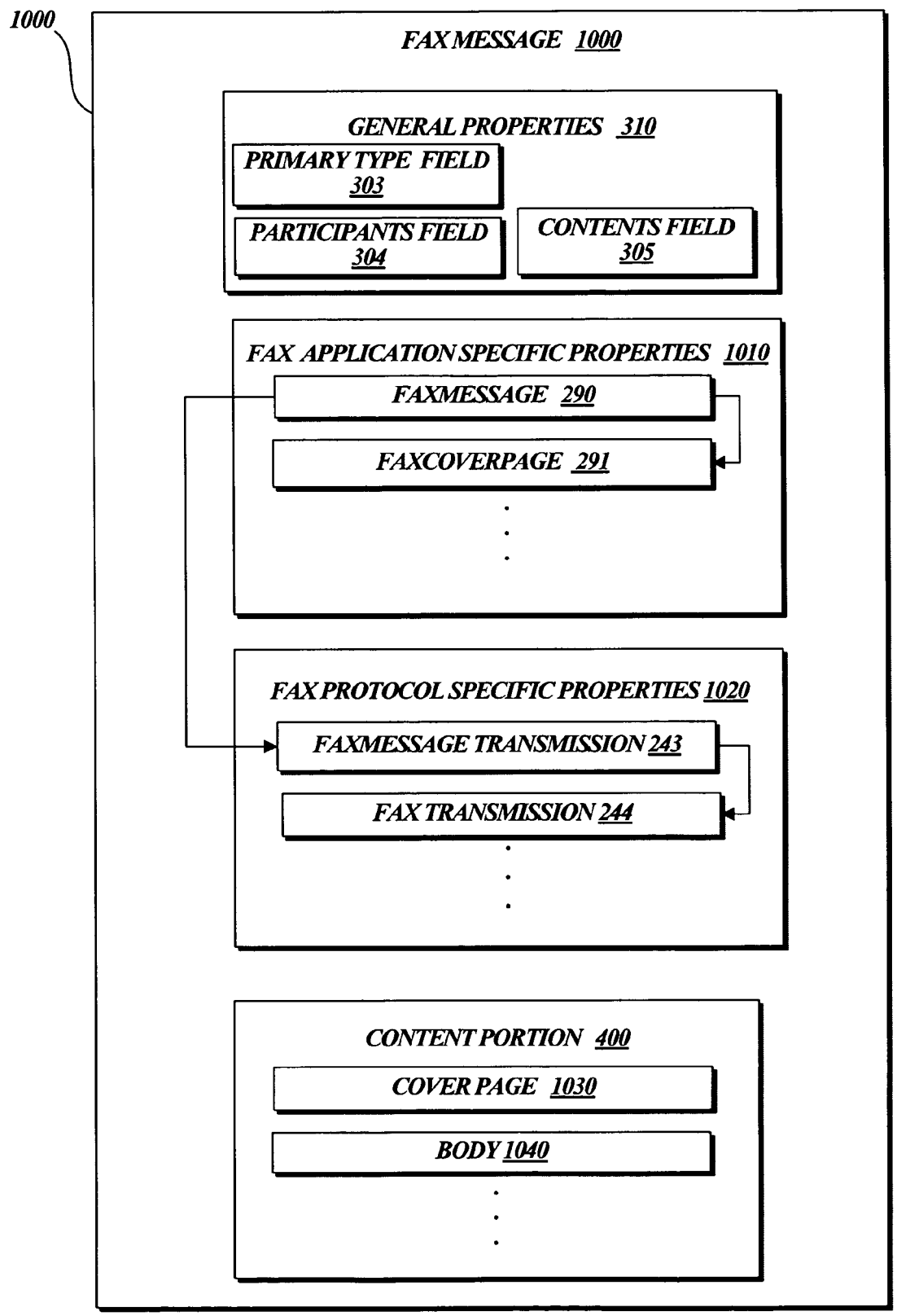
FIG. 10 illustrates an example electronic message representing a fax transmission formatted in accordance with the principles of the present invention.
Figure 11:
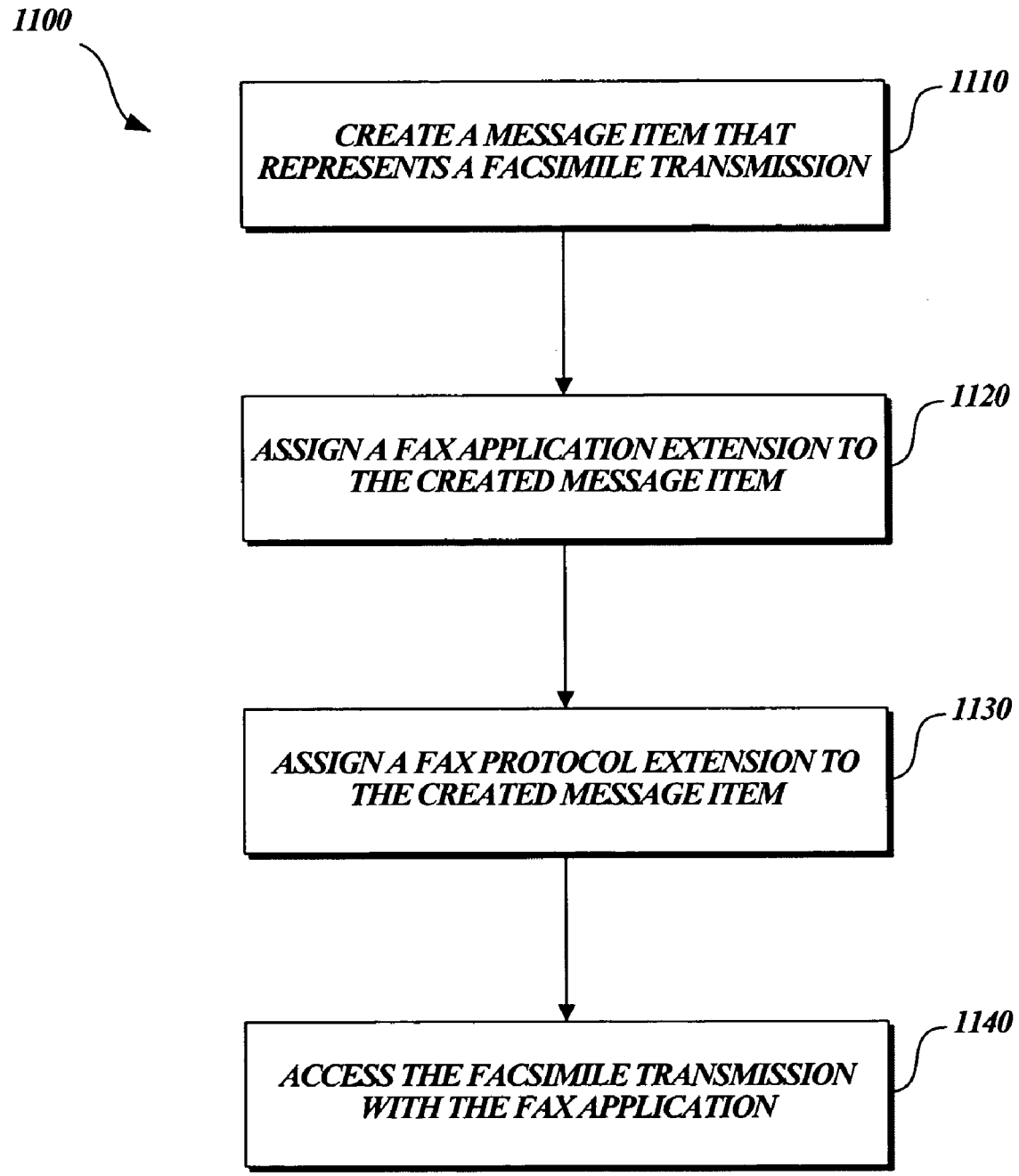
FIG. 11 illustrates an example flowchart of a method for creating an electronic message representing a fax transmission in accordance with the principles of the present invention.

FIG. 10 illustrates another example of a particular type of message formatted as an electronic message 300, this time a fax message 1000 formatted in accordance with the principles of the present invention. FIG. 11 illustrates an example flowchart of a method 1100 for creating a fax message 1000 in accordance with the principles of the present invention. The method 1100 will be described with respect to network architecture 100, schema hierarchy 150, fax schemas 226, 235, and 257, electronic message 300, and fax message 1000. Any of the messages depicted in network architecture 100 (i.e., message items 107, 108, 112, and 116) that represent fax messages can be similar in format to fax message 1100.

The method 1100 includes a process 1110 for creating a message item that represents a fax transmission. The process 1110 may include creating a message item that represents a fax message 1000 as illustrated in FIG. 10. For example, computer system 102 or computer system 109 can create a message item that represents a fax message (e.g., electronic message item 108 or 112). It may be that a message item is created in response to user-input, such as, for example, selecting a "Send a Fax" option for a user-interface. User-input can be received locally, for example, from a local input device, such as a keyboard or mouse, or can be received from a remote location, for example, from some other network connectable computer system.

As with other types of electronic messages, the process 1100 for creating the message item for a fax message may include creating a data structure that includes one or more fields defined in accordance with base item schema 151 and message schema 152. As shown in FIG. 10, fields defined in accordance with base item schema 151 and message schema 152 can represent general properties 301 that are common to a plurality of different types of electronic messages, including the fax message 1000. Since the message is a fax message the general property 310 containing the primary type field 303 is assigned a value to indicate that the message is a fax message.

As previously explained, the content of a broadcast fax message may differ for each recipient because the cover page rendering reflects differences in each recipient's contact information. In addition, the content may differ because the body of each fax transmission contains a fax banner (the small text that appears at the top of each page of a fax transmission) that reflects the time of the transmission to that particular recipient. Thus, creating the message item for a fax message 1000 may include creating a data structure that includes one or more fields defined in accordance with a content schema 156 that defines formats for representing the one or more portions of content 400 associated with the fax message 1000, e.g., the .tiff images that contain the cover pages and body of each fax transmission. Accordingly, the process 1110 further includes creating the content relationships between the message item and the content portion 400 of the fax message 1000 in accordance with a message content schema 216 that defines the cover page 1030 and body 1040 content portions of the fax message as transmitted to each recipient. In one embodiment, the process 1110 includes assigning to the general Contents field 305 of the general properties 310 one or more content relationships for each recipient of a broadcast fax message, each of which represent links to corresponding cover page 1030 and body 1040 portions of content 400 associated with each transmission of the fax message 1000 to a particular recipient.

As with other types of electronic messages, creating the message item for a fax message may include assigning one or more application extensions to the created message item that define formats for representing fax application specific properties 1010 for the fax message 1000. Accordingly, the method 1100 includes a process 1110 to assign a fax application extension to the created message item. For example, while the general contents field 305 of the general properties 310 can be assigned one or more message content relationships representing links to the one or more portions of content associated with fax message 1000, as previously described, a fax message schema 290 defines additional fax application specific properties 1010 that further define the message content associated with the fax message 1000. For instance, since each recipient of a broadcast fax typically receives a different cover page, the fax message schema 290 defines a cover page information field that links to additional information about the cover page used in transmitting the fax message to the recipients, i.e., data field CoverPageInfo in schema 290. In this case the additional information about the cover page is defined in another schema, the fax cover page schema 291, which defines such information as the cover page name in data field CoverPageName, and the value of the cover page note in data field Note.

The vertical ellipsis in the fax application specific properties 1010 represents that other fax application specific fields can also be included, such as the schedule type used to indicate when to schedule sending a fax, e.g., now or later, when discount rates apply. The data fields of the fax application specific properties 1010 may correspond generally to data formats described above in Tables 22-23. As with other types of electronic messages, creating the message item for a fax message 1000 may include assigning one or more protocol extensions to the created message item that define formats for representing fax protocol specific properties 1020 for the fax message. Since each recipient of a broadcast fax may receive faxes using different fax transport protocols, the specific information about the fax transmission may differ from one recipient to the next. Hence, the specific information about the fax transmission for a participant is defined in a fax protocol extension to the message item, such as the fax transmission schema 244 of the fax protocol specific properties 1020. The number of such extensions that may be assigned to the created message item will vary depending on the number of recipients of a given fax message.

An example of fax protocol specific information about a fax transmission that typically is different for each recipient is the called station identifier of the device used to receive an incoming fax transmission for the recipient, e.g., the data field DeviceCsid in schema 244. Accordingly, the method 1100 includes a process 1130 to assign a fax protocol extension to the created message item to represent the fax protocol specific information about the fax transmission for a particular recipient. In one embodiment, the process 1120 may include assigning to an application specific property 1010 one or more message recipient relationships representing links to one or more recipients of the fax message represented by the fax message schema 290. For example, the process 1120 may include assigning to the recipients data field of the fax message schema 290 a recipient relationship that refers or links to specific information about the fax transmission for each recipient of the fax message 1000. The recipient relationship may be further defined in accordance with the fax message transmission schema 243 definition of fax protocol specific properties 1010. For example, the process 1120 may further include assigning to a transmission details data field of the fax message transmission schema 243 the recipient relationship that refers or links to specific information about the fax transmission for each recipient of the fax message 1000, where the specific information about the fax transmission for the recipient is represented by the fax transmission schema 244. In an alternate embodiment, the process 1120 may include assigning to the general Participants field 304 of the general properties 310 the recipient relationships representing links to one or more participants associated with fax message 1000, including the recipients of the fax message 1000. As before, the participants associated with the fax message 1000 may be represented by the fax message transmission schema 243, which, in turn, links to the specific information about the fax transmission for the recipient as represented by the fax transmission schema 244. The vertical ellipsis in the fax protocol specific properties 1020 represents that other fax protocol specific fields can also be included, such as the transmission ID used to identify the transmission to the participant, the current page number, and the transmission start and end times. The data fields of the fax protocol specific properties 1020 may correspond generally to data formats described above in Tables 20-21.

Once the message item for a fax message has been created and extensions assigned, the fax message is capable of being efficiently stored and accessed for processing by any one of a number of fax protocols corresponding to the assigned fax protocol extensions, or fax applications corresponding to the assigned fax application extensions. Accordingly, the method 1100 includes a process 1140 to access the fax message with the fax application using the created message item. For example, if a PC-based fax application extension has been assigned, the created message item is now compatible with the PC-based fax application and may be accessed and processed accordingly.

Figure 12:
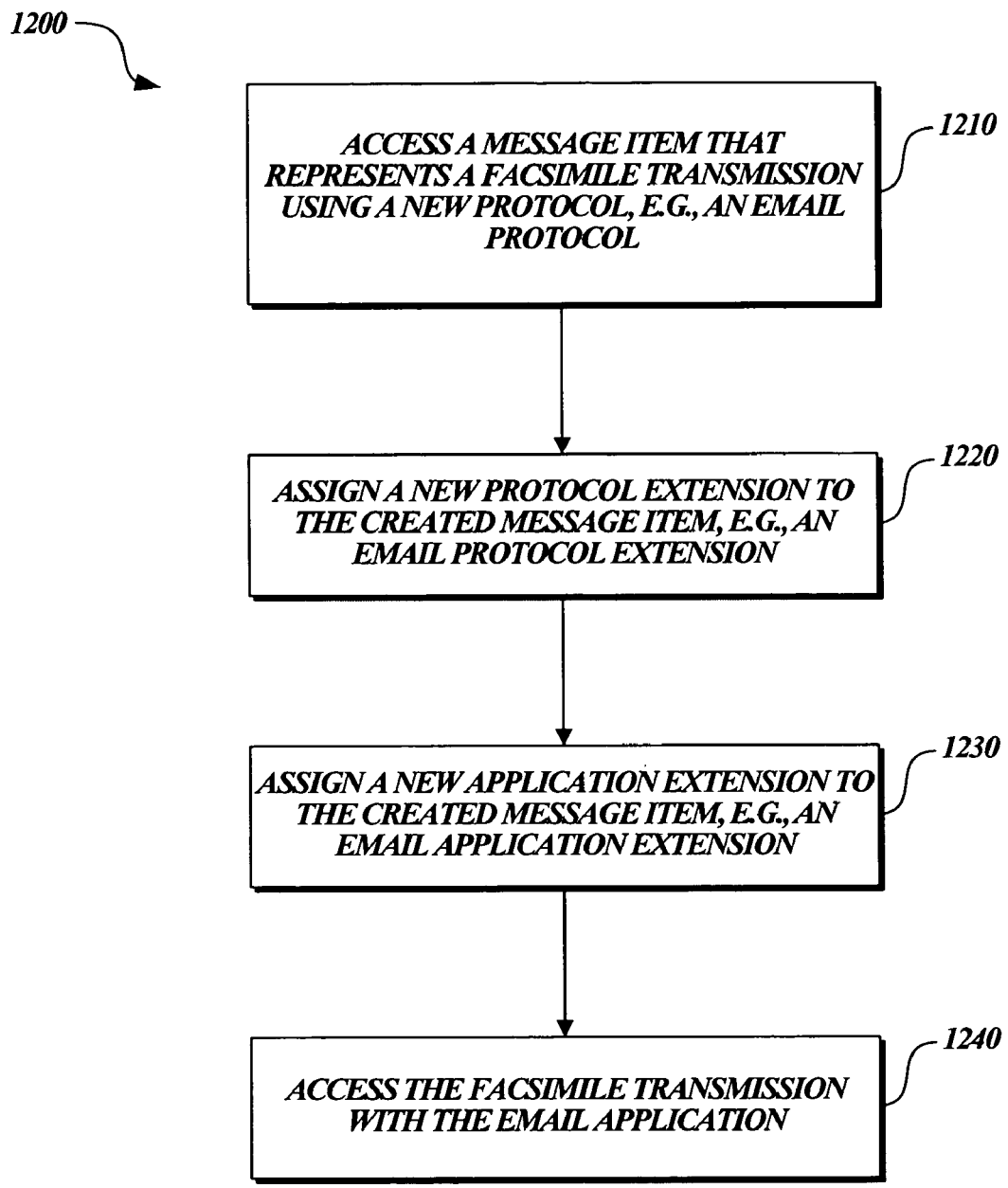
FIG. 12 illustrates an example flowchart of a method for transforming an electronic message representing a fax transmission for compatibility with a new message extension in accordance with the principles of the present invention.

As with electronic messages in general, in some embodiments, values in fields defined in accordance with one fax extension schema are retrieved and utilized to populate fields defined in accordance with another message extension schema, either a fax extension schema, or another type of message extension schema. Thus, a fax message can be efficiently transformed for compatibility with a protocol or application corresponding to the other extension schema. FIG. 12 illustrates an example flowchart of a method 1200 for transforming a fax message for compatibility with another message extension in accordance with the principles of the present invention. The method 1200 will be described with respect to network architecture 100, schema hierarchy 150, fax message 1100, and fax schemas 243, 244, 290, and 291.

The method 1200 includes a process 1210 for accessing a message item that represents a fax message using a new protocol. For example, computer system 102 can access message item 107 representing a fax message, but with an email protocol, such as when a fax transmission is received in a general fax server and relayed to its ultimate destination recipient as an attachment to an electronic mail message.

The method 1200 includes a process 1220 for using values of currently assigned extension specific fields to translate the electronic message item for compatibility with a new message protocol extension. The process 1220 may include using values of currently assigned fax extension specific fields to populate new extension specific fields when assigning the new message extension to the message item. For example, computer system 102 can assign a new message extension to message item 107. Similarly, computer system 109 can assign a new message extension message item 108 or message item 116. A newly assigned message extension can include one or more data fields defined in accordance with a message protocol extension schema.

For example, computer system 109 may assign an electronic mail protocol extension corresponding to a particular electronic mail protocol to a message item 107 that is currently assigned a fax protocol extension corresponding to the fax protocol that was used to receive the fax on the fax server. The assignment of the new extension promotes compatibility of the fax server with the electronic mail system, which will eventually be used to deliver the fax message to its final destination, e.g., a particular addressee of the electronic mail system. The computer system can send the message item in accordance with both the currently assigned fax protocol message extension and the new electronic mail protocol message extension.

In a similar manner, the method 1200 includes a process 1230 for using values of currently assigned extension specific fields to translate the electronic message item for compatibility with a new message application extension. The process 1230 may include using values of currently assigned fax application specific fields to populate new application specific fields when assigning the new message application extension to the message item. The new message application extension can include one or more data fields defined in accordance with a message application extension schema.

For example, computer system 109 may assign an electronic mail application extension corresponding to a particular mail client to a message item 107 that is currently assigned a fax application extension corresponding to a PC-based fax application to promote compatibility of the PC-based fax application with the electronic mail application and vice versa. The computer system can send the message item in accordance with both the currently assigned message application extension and the newly assigned message application extension. Accordingly, the method 1200 may include a process 1240 for accessing the fax message with the new message application extension, e.g., with the electronic mail application instead of the PC-based fax application (or vice versa).

Accordingly, a single message item representing a particular fax message can be sent to a number of applications, such as an electronic mail application or a PC-based fax application, without having to duplicate the content of the message item. Sending a single message item increases the likelihood of different applications, for example, the electronic mail application and a fax application, receiving consistent data. Moreover, in one embodiment, a message item representing a fax message can be simultaneously assigned both a fax protocol extension and an electronic mail application extension so that the fax message can be viewed inside an electronic mail client such as Microsoft's Outlook Express, just like any other electronic mail message. Such a message item is still processed by a fax transport because of the fax protocol extension to which it is attached. In other embodiments, alternative combinations of extensions not explicitly described herein may also simultaneously assigned without departing from the scope of the claims that follow.

Figure 7:
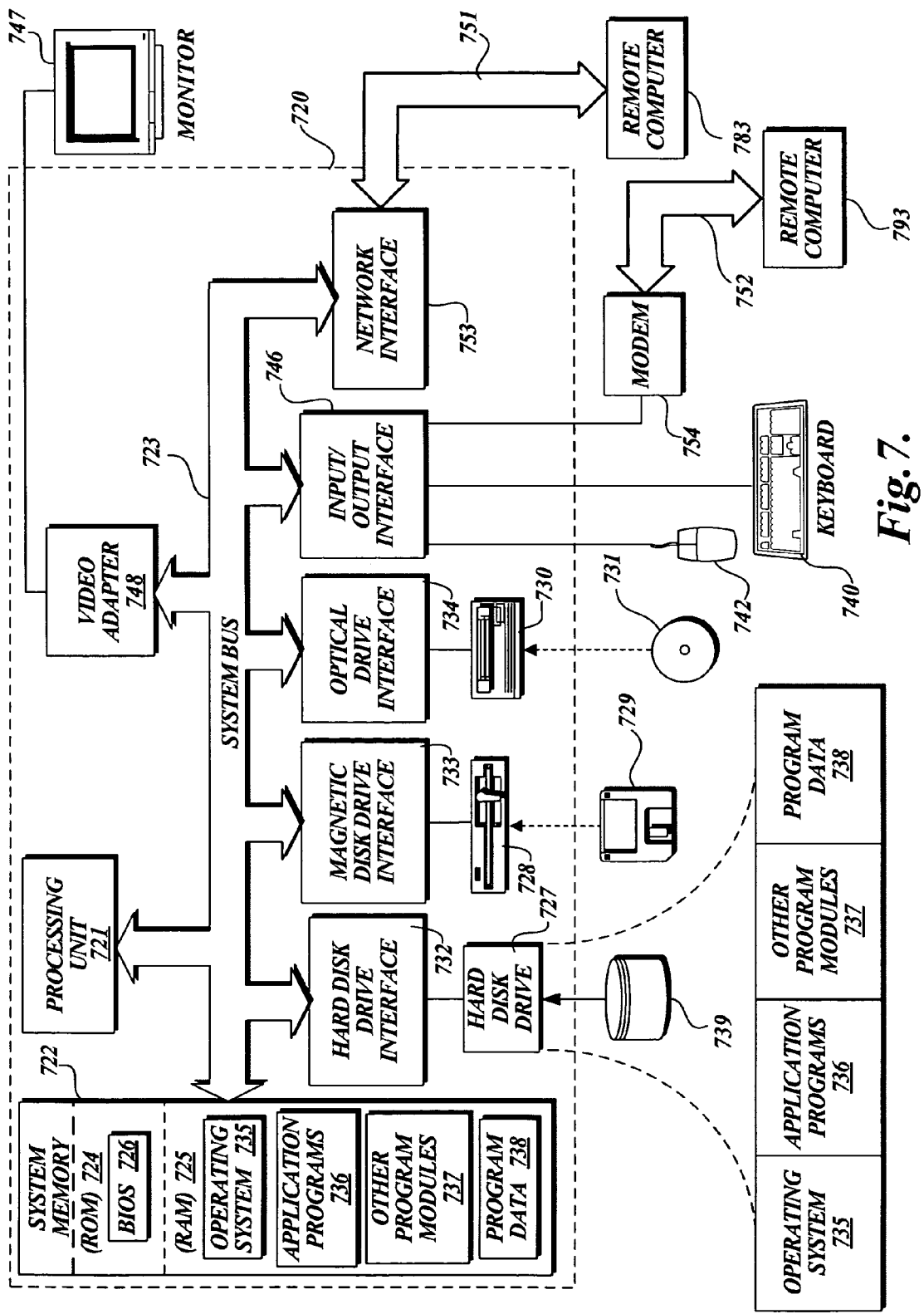
FIG. 7 illustrates a suitable operating environment for the principles of the present invention.

FIG. 7 and the following discussion are intended to provide a brief, general description of a suitable computing environment in which the invention may be implemented. Although not required, the invention will be described in the general context of computer-executable instructions, such as program modules, being executed by computer systems. Generally, program modules include routines, programs, objects, components, data structures, and the like, which perform particular tasks or implement particular abstract data types. Computer-executable instructions, associated data structures, and program modules represent examples of the program code means for executing acts of the methods disclosed herein.

With reference to FIG. 7, an example system for implementing the invention includes a general-purpose computing device in the form of computer system 720, including a processing unit 721, a system memory 722, and a system bus 723 that couples various system components including the system memory 722 to the processing unit 721. Processing unit 721 can execute computer-executable instructions designed to implement features of computer system 720, including features of the present invention. The system bus 723 may be any of several types of bus structures including a memory bus or memory controller, a peripheral bus, and a local bus using any of a variety of bus architectures. The system memory includes read only memory ("ROM") 724 and random access memory ("RAM") 725. A basic input/output system ("BIOS") 726, containing the basic routines that help transfer information between elements within computer system 720, such as during start-up, may be stored in ROM 724.

The computer system 720 may also include magnetic hard disk drive 727 for reading from and writing to magnetic hard disk 739, magnetic disk drive 728 for reading from or writing to removable magnetic disk 729, and optical disk drive 730 for reading from or writing to removable optical disk 731, such as, or example, a CD-ROM or other optical media. The magnetic hard disk drive 727, magnetic disk drive 728, and optical disk drive 730 are connected to the system bus 723 by hard disk drive interface 732, magnetic disk drive-interface 733, and optical drive interface 734, respectively. The drives and their associated computer-readable media provide non-volatile storage of computer-executable instructions, data structures, program modules, and other data for the computer system 720. Although the example environment described herein employs magnetic hard disk 739, removable magnetic disk 729 and removable optical disk 731, other types of computer readable media for storing data can be used, including magnetic cassettes, flash memory cards, digital versatile disks, Bernoulli cartridges, RAMs, ROMs, and the like.

Program code means comprising one or more program modules may be stored on hard disk 739, magnetic disk 729, optical disk 731, ROM 724 or RAM 725, including an operating system 735, one or more application programs 736, other program modules 737, and program data 738. A user may enter commands and information into computer system 720 through keyboard 740, pointing device 742, or other input devices (not shown), such as, for example, a microphone, joy stick, game pad, scanner, or the like. These and other input devices can be connected to the processing unit 721 through input/output interface 746 coupled to system bus 723. Input/output interface 746 logically represents any of a wide variety of different interfaces, such as, for example, a serial port interface, a PS/2 interface, a parallel port interface, a Universal Serial Bus ("USB") interface, or an Institute of Electrical and Electronics Engineers ("IEEE") 1394 interface (i.e., a FireWire interface), or may even logically represent a combination of different interfaces.

A monitor 747 or other display device is also connected to system bus 723 via video interface 748. Speakers 769 or other audio output device is also connected to system bus 723 via audio interface 749. Other peripheral output devices (not shown), such as, for example, printers, can also be connected to computer system 720.

Computer system 720 is connectable to networks, such as, for example, an office-wide or enterprise-wide computer network, a home network, an Intranet, and/or the Internet. Computer system 720 can exchange data with external sources, such as, for example, remote computer systems, remote applications, and/or remote databases over such networks.

Computer system 720 includes network interface 753, through which computer system 720 receives data from external sources and/or transmits data to external sources. As depicted in FIG. 1, network interface 753 facilitates the exchange of data with remote computer system 783 via link 751. Network interface 753 can logically represent one or more software and/or hardware modules, such as, for example, a network interface card and corresponding Network Driver Interface Specification ("NDIS") stack. Link 751 represents a portion of a network (e.g., an Ethernet segment), and remote computer system 783 represents a node of the network.

Likewise, computer system 720 includes input/output interface 746, through which computer system 720 receives data from external sources and/or transmits data to external sources. Input/output interface 746 is coupled to modem 754 (e.g., a standard modem, a cable modem, or digital subscriber line ("DSL") modem) via data link 759, through which computer system 720 receives data from and/or transmits data to external sources. As depicted in FIG. 7, input/output interface 746 and modem 754 facilitate the exchange of data with remote computer system 793 via link 752. Link 752 represents a portion of a network and remote computer system 793 represents a node of the network.

While FIG. 7 represents a suitable operating environment for the present invention, the principles of the present invention may be employed in any system that is capable of, with suitable modification if necessary, implementing the principles of the present invention. The environment illustrated in FIG. 7 is illustrative only and by no means represents even a small portion of the wide variety of environments in which the principles of the present invention may be implemented.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes, which come within the meaning and range of equivalency of the claims, are to be embraced within their scope.

The embodiments of the invention in which an exclusive property or privilege is claimed are defined as follows:

1. A computer-implemented method comprising:
    creating, in a network-connectable computer system, a message item from a fax message, the message item representing the fax message in accordance with a message schema, the message item having one or more general properties that are common to at least one of a plurality of different types of message protocols and message applications, wherein the message schema includes data fields that point to information in other data fields in connection with another schema in a schema hierarchy, wherein the message item is configured to enable more than one fax protocol extension and more than one fax application extension to be included in the message item together to enable the message item to be sent to each of a number of applications without duplication of the message item between the applications, each fax protocol extension comprising one or more data fields specific to a protocol associated with the fax protocol extension and each fax application extension comprising one or more data fields specific to a fax application associated with the fax application extension; and
    linking one or more content portions of the fax message to the created message item, the one or more content portions of the fax message representing at least one of a cover page and a body of the fax message.

2. The method as recited in claim 1, wherein the fax message is a broadcast fax message to a plurality of recipients, and the one or more content portions each represent a different cover page as rendered for each of the plurality of recipients of the broadcast fax.

3. The method as recited in claim 1, further comprising:
    assigning one or more fax protocol extensions to the created message item, each fax protocol extension representing a recipient of the fax message and linking to a fax transmission item representing details about a fax transmission of the fax message to the recipient in accordance with a fax protocol extension schema, the fax transmission item adding one or more protocol specific properties to the created message item so as to promote compatibility between the one or more linked content portions and a specified fax transmission protocol.

4. The method as recited in claim 3, wherein the fax transmission item represents details about the fax transmission of the fax message to one of the plurality of the recipients in accordance with the fax protocol extension schema for the specified fax transmission protocol used to transmit the fax message to the recipient.

5. The method as recited in claim 3, wherein the one or more protocol specific properties added to the message item by the fax transmission item include a name of a device used to transmit the fax message to the recipient.

6. The method as recited in claim 5, wherein the one or more protocol specific properties added to the message item by the fax transmission item include a called station identifier of the device used to transmit the fax message to the recipient.

7. The method as recited in claim 5, wherein the one or more protocol specific properties added to the message item by the fax transmission item include a transmitting station identifier of the device used to transmit the fax message to the recipient.

8. The method as recited in claim 3, wherein the one or more protocol specific properties added to the message item by the fax transmission item include a status of the fax transmission to the recipient.

9. The method as recited in claim 3, wherein the one or more protocol specific properties added to the message item by the fax transmission item include an extended status of the fax transmission to the recipient, the extended status including a description the extended status represented by at least one of a code and a text string.

10. The method as recited in claim 3, wherein the one or more protocol specific properties added to the message item by the fax transmission item include a number of retries made to transmit the fax message to the recipient.

11. The method as recited in claim 3, wherein the one or more protocol specific properties added to the message item by the fax transmission item include a number of retries associated with the fax transmission.

12. The method as recited in claim 11, wherein fax message is an outgoing fax message and the number of retries associated with the fax transmission includes a number of times a destination number associated with the recipient was called.

13. The method as recited in claim 11, wherein fax message is an incoming fax message and the number of retries associated with the fax transmission includes a number of attempts to route the fax message to the recipient.

14. The method as recited in claim 3, wherein the one or more protocol specific properties added to the message item by the fax transmission item include a unique identifier associated with the fax transmission.

15. The method as recited in claim 14, wherein the unique identifier uniquely identifies the fax transmission from other fax transmissions on a particular fax server.

16. The method as recited in claim 3, wherein the one or more protocol specific properties added to the message item by the fax transmission item include a time stamp indicating when the fax transmission commenced.

17. The method as recited in claim 3, wherein the one or more protocol specific properties added to the message item by the fax transmission item include a time stamp indicating when the fax transmission ended.

18. The method as recited in claim 3, wherein the one or more protocol specific properties added to the message item by the fax transmission item include a number of a page of the fax transmission currently being transmitted.

19. The method as recited in claim 1, further comprising:
assigning one or more fax application extensions to the message item, each fax application extension representing an application with which the fax message is processed and linking to a fax message item representing details about the fax message in accordance with a fax application extension schema, the fax message item adding one or more application specific properties to the created message item so as to promote compatibility between the one or more linked content portions and a specified application.

20. The method as recited in claim 19, wherein the fax message is an incoming fax message and the one or more application specific properties added to the message item by the fax message item include an identifier of a calling device from which the fax message was transmitted.

21. The method as recited in claim 20, wherein the identifier of the calling device from which the fax message was transmitted is a caller ID containing a telephone number of the calling device.

22. The method as recited in claim 19, wherein the one or more application specific properties added to the message item by the fax message item include a display name of the fax message.

23. The method as recited in claim 19, wherein the fax message is an outgoing fax message and the one or more application specific properties added to the message item by the fax message item include a schedule type of the fax message, the schedule type indicating whether the transmission of the fax message is one of sent now or deferred to a later time.

24. The method as recited in claim 23, wherein the schedule type indicating that the transmission of the fax message is deferred to a later time includes the schedule type indicating that the later time is one of a specific time and a time period during which discount rates apply.

25. The method as recited in claim 19, wherein the fax message is an outgoing fax message and the one or more application specific properties added to the message item by the fax message item include a delivery receipt type of the fax message, the delivery receipt type indicating whether a receipt has been requested.

26. The method as recited in claim 25, wherein the delivery receipt type indicates the receipt has been requested to be delivered by one of email and instant message.

27. The method as recited in claim 19, wherein the fax message is an outgoing fax message and the one or more application specific properties added to the message item by the fax message item include a delivery receipt type parameter, the delivery receipt type parameter indicating a destination to which to deliver the receipt, the destination including an email address.

28. The method as recited in claim 19, wherein the fax message is an outgoing fax message and the one or more application specific properties added to the message item by the fax message item include a group broadcast receipt flag, the group broadcast receipt flag indicating whether one of a separate receipt for each recipient and a summary receipt for all recipients of the fax message has been requested.

29. The method as recited in claim 19, wherein the fax message is an outgoing fax message and the one or more application specific properties added to the message item by the fax message item include an attach fax to receipt flag, the attach fax to receipt flag indicating whether to attach the fax message to the receipt has been requested.

30. The method as recited in claim 19, wherein the one or more application specific properties added to the message item by the fax message item include a number of pages of the fax message, the number of pages including the cover page.

31. The method as recited in claim 19, wherein the one or more application specific properties added to the message item by the fax message item include a broadcast identifier of the fax message, the broadcast identifier uniquely identifying a broadcast fax message broadcast to more than one recipient.

32. The method as recited in claim 19, wherein the one or more application specific properties added to the message item by the fax message item include a link to a fax cover page item, the fax cover page item including additional application specific properties to add to the message item, the additional application specific properties describing the cover page.

33. The method as recited in claim 19, wherein the one or more additional application specific properties added to the message item by the fax cover page item include a name of the cover page, the name containing a relative file name when the fax cover page was created with a fax service, and an absolute file name when the fax cover page was created on a client, the absolute file name specifying a pathname of the file in which the fax cover page is contained.

34. The method as recited in claim 19, wherein the one or more additional application specific properties added to the message item by the fax cover page item include a note field of the cover page, the note field containing a value of a note appearing on the fax cover page.

35. One or more computer-readable hardware storage having stored thereon a data structure representing a fax message, the data structure comprising:
   a general properties field representing properties of an electronic message that are common to at least one of a plurality of different types of message protocols and a plurality of different types of message applications;
   a type specific property field indicating that the electronic message is a fax message; and
   a content specific property field referring to a content portion of the data structure, wherein the content portion of the data structure includes at least one cover page content field representing a cover page associated with each recipient of the fax message, and at least one body content field representing a body associated with the fax message;
   wherein the data structure is configured to be used in connection with a message schema that includes data fields that point to information in one or more other data fields in another schema in a schema hierarchy, and
   wherein the data structure is configured to enable more than one protocol extension to be included in the data structure together, each protocol extension comprising at least one data field specific to a protocol associated with the protocol extension.

36. The one or more computer-readable hardware storage having stored thereon a data structure representing a fax message, as recited in claim 35, the at least one data field specific to a protocol associated with the protocol extension comprising:
   at least one fax protocol specific property field, the at least one fax protocol specific property field representing one or more protocol specific properties that correspond to a specific fax protocol used to transmit the fax message to a recipient of the fax message, the specific fax protocol being selecting from among the plurality of different types of message protocols.

37. The one or more computer-readable hardware storage having stored thereon a data structure representing a fax message, as recited in claim 35, the data structure further comprising:
   at least one application specific property field, the at least one application specific property field representing one or more application specific fax message properties that correspond to a specific message application, the specific message application being selected from among a plurality of different types of message applications with which the fax message can be processed.

38. One or more computer-readable hardware storage having stored thereon a data structure representing a fax account, the data structure comprising:
   an ID field representing an identifier that identifies a fax account within a fax service, the fax account being associated with a transmission of a fax message;
   a Type field representing an identifier that identifies a type of the fax account within the fax service, the type including one of a local modem account, an MFP account, a shared fax service account, an exchange server account, and an Internet FSP account; and
   a Name field representing a user name associated with the fax account;
   wherein the data structure is configured to be used in connection with a message schema that includes data fields that point to information in one or more other data fields in another schema in a schema hierarchy, and
   wherein the data structure is configured to enable more than one protocol extension to be included in the data structure together, a protocol extension comprising more than one data field specific to a protocol associated with the protocol extension.

39. The one or more computer-readable hardware storage having stored thereon a data structure representing a fax account, as recited in claim 38, wherein the fax account data structure is further comprised of:
   a Mode field representing a flag indicating whether the fax account is in one of an offline mode and an online mode;
   a Billing Code field representing an entity to which costs associated with the transmission of the fax message are assigned;
   a Cover Page Name representing a name of a default cover page used in the transmission of the fax message;
   a Server Based field representing a flag indicating whether the default cover page is server based;
   an Instant Message address field representing a default instant message address for sending a delivery receipt for the transmission of the fax message; and
   an Email Address field representing a default email address for sending the delivery receipt for the transmission of the fax message.

40. One or more computer-readable hardware storage having stored thereon a data structure for representing a fax message, the data structure comprising:
   an ID field representing an identifier that identifies a fax message within an message database; and
   at least one MessageContents relationship field representing links to one or more portions of content corresponding to the fax message identified by the identifier represented in the ID field, the one or more portions of content including a cover page for each of one or more recipients of the fax message and a body of the fax message as transmitted to each of the one or more recipients of the fax message;
   wherein the data structure is configured to be used in connection with a message schema that includes data fields that point to information in one or more other data fields in another schema in a schema hierarchy, and
   wherein the data structure is configured to enable more than one protocol extension to be included in the data structure together, a protocol extension comprising more than one data field specific to a protocol associated with the protocol extension.

41. The one or more computer-readable hardware storage having stored thereon a data structure representing a fax message as recited in claim 40, further comprising:
   a fax message data structure representing an application with which the fax message identified by the identifier represented in the ID field is processed, wherein the fax message data structure is comprised of:
      a CallerID field representing an identifier of a device used to initiate a transmission of the fax message identified by the identifier represented in the ID field to the one or more recipients of the fax message;
a DeliveryReceiptType field representing a type of delivery receipt that was requested to be sent to confirm delivery of the fax message identified by the identifier represented in the ID field to the one or more recipients of the fax message, the delivery receipt including an email delivery receipt, an instant message delivery receipt and no delivery receipt;
a DeliveryReceiptTypeParameter field representing a type of delivery receipt parameter for the fax message identified by the identifier represented in the ID field to the one or more recipients of the fax message, the delivery receipt parameter including an address to which the delivery receipt is sent, the address including an email address when the type of the delivery receipt requested is one of an email delivery receipt and an instant message delivery receipt;
a GroupBroadcastReceipts field representing a flag indicating one of whether a separate delivery receipt is requested for each of the one or more recipients of the fax message to whom the fax message identified by the identifier represented in the ID field was delivered, and whether a summary delivery receipt is requested for all of the one or more recipients to whom the fax message identified by the identifier represented in the ID field was delivered;
an AttachFaxToReceipt field representing a flag indicating whether to attach the fax message to the delivery receipt when the delivery receipt is requested for each of the one or more recipients to whom the fax message identified by the identifier represented in the ID field was delivered;
a BroadcastID field representing an unique identifier with which a service may identify the fax message on a particular server;
a Recipient field representing one or more links to a transmission data structure, wherein each of the links to the transmission data structure represents one of the one or more recipients of the fax message identified by the identifier represented in the ID field; and
a CoverPageInfo field representing a link to a fax cover page data structure, wherein the fax cover page data structure is comprised of:
a CoverPageName field representing one of a relative file name of the file containing the fax cover page when the fax cover page was created with a fax service, and an absolute file name when the fax cover page was created on a client, wherein the absolute file name specifies a pathname of the file containing the fax cover page;
a ServerBased field representing a flag indicating whether the cover page was generated by a fax server, and a Note field representing text appearing in a note section of the cover page.

42. The one or more computer-readable hardware storage having stored thereon a data structure representing a fax message as recited in claim 41, wherein the fax message data structure is further comprised of:
a DocumentName field representing a display name to display whenever the application displays the fax message identified by the identifier represented in the ID field to a display device; and
a ScheduleType field representing a type of delivery schedule used to transmit the fax message identified by the identifier represented in the ID field to the one or more recipients of the fax message, the delivery schedule including delivering the fax message at a specified time, delivering the fax message at a time when discount transmission rates apply, and delivering the fax message immediately.

43. The one or more computer-readable hardware storage having stored thereon a data structure representing a fax message as recited in claim 41, wherein the transmission data structure represents a transmission of the fax message to the one or more recipients of the fax message identified by the identifier represented in the ID field, and wherein the transmission data structure is comprised of:
a DeviceName field representing an a name of a device used to transmit the fax message identified by the identifier represented in the ID field to one of the recipients represented in the Recipient field;
a DeviceCsid field representing a called station identifier of the device used to transmit the fax message identified by the identifier represented in the ID field to one of the recipients represented in the Recipient field;
a DeviceTsid field representing a transmitting station identifier of the device used to transmit the fax message identified by the identifier represented in the ID field to one of the recipients represented in the Recipient field;
a Status field representing an indication of a current transmission status of a transmission of the fax message identified by the identifier represented in the ID field to one of the recipients represented in the Recipient field;
a Retries field representing a number of retries made during the transmission of the fax message identified by the identifier represented in the ID field to one of the recipients represented in the Recipient field; and
a TransmissionID field representing a unique ID used to identify the transmission of the fax message identified by the identifier represented in the ID field to one of the recipients represented in the Recipient field.

44. The one or more computer-readable hardware storage having stored thereon a data structure representing a fax message as recited in claim 43, wherein the fax transmission data structure is further comprised of:
an ExtendedStatusCode field representing a code describing an extended transmission status of the transmission of the fax message identified by the identifier represented in the ID field to one of the recipients represented in the Recipient field;
an ExtendedStatusString field representing a text string describing the extended transmission status of the transmission of the fax message identified by the identifier represented in the ID field to one of the recipients represented in the Recipient field;
TransmissionStart field representing a time when the transmission of the fax message identified by the identifier represented in the ID field to one of the recipients represented in the Recipient field started;
a TransmissionEnd field representing a time when the transmission of the fax message identified by the identifier represented in the ID field to one of the recipients represented in the Recipient field ended; and
a CurrentPage field representing a number of a page of the transmission of the fax message identified by the identifier represented in the ID field currently being transmitted to one of the recipients represented in the Recipient field.

* * * * *